(12) United States Patent
Zhu

(10) Patent No.: US 11,187,006 B2
(45) Date of Patent: Nov. 30, 2021

(54) FENCE ACCESSORY

(71) Applicant: Alan Qing-Lin Zhu, Ontario, CA (US)

(72) Inventor: Alan Qing-Lin Zhu, Ontario, CA (US)

( * ) Notice: Subject to any disclaimer, the term of this patent is extended or adjusted under 35 U.S.C. 154(b) by 371 days.

(21) Appl. No.: 16/137,488

(22) Filed: Sep. 20, 2018

(65) Prior Publication Data

US 2019/0085588 A1 Mar. 21, 2019

(30) Foreign Application Priority Data

Sep. 20, 2017 (CN) .......................... 201721213731.X

(51) Int. Cl.
| | | |
|---|---|---|
| *E04H 17/14* | (2006.01) | |
| *E04H 17/00* | (2006.01) | |
| *F16B 7/04* | (2006.01) | |

(52) U.S. Cl.
CPC ....... *E04H 17/1439* (2013.01); *E04H 17/006* (2021.01); *F16B 7/0433* (2013.01)

(58) Field of Classification Search
CPC .. E04F 11/1842; E04H 17/14; E04H 17/1417; E04H 17/1421; E04H 17/1426; E04H 17/1439; E04H 17/168; E04H 2017/006; F16B 7/0433; Y10T 403/348; Y10T 403/3906; Y10T 403/7129; Y10T 403/7171
USPC ..... 256/1, 21, 22, 65.01; 403/177, 188, 389, 403/396
See application file for complete search history.

(56) References Cited

U.S. PATENT DOCUMENTS

| | | | | |
|---|---|---|---|---|
| 243,280 | A | * | 6/1881 | Martin ................ E04H 17/1443 256/22 |
| 4,022,435 | A | * | 5/1977 | Glass ...................... E04H 17/00 256/1 |
| 4,945,703 | A | * | 8/1990 | Mascotte .................. E04C 2/42 52/663 |
| 6,260,828 | B1 | | 7/2001 | English |

(Continued)

FOREIGN PATENT DOCUMENTS

| | | | | |
|---|---|---|---|---|
| DE | 29702067 U1 | * | 4/1997 | ............ E04H 17/14 |
| EP | 2133489 A1 | | 12/2009 | |
| FR | 2853702 A1 | * | 10/2004 | ............ F16B 7/0433 |

OTHER PUBLICATIONS

International Search Report and Written Opinion of the International Searching Authority, dated Nov. 20, 2018, Corresponding to PCT/US18/52090, 18 pages.

(Continued)

*Primary Examiner* — Josh Skroupa
(74) *Attorney, Agent, or Firm* — Lewis Roca Rothgerber Christie LLP

(57) ABSTRACT

A fence accessory includes at least two ornament bodies, each of the at least two ornament bodies including a first connecting part and a second connecting part at two opposing ends thereof. The first connecting part of one of the at least two ornament bodies and the second connecting part of an other one of the at least two ornament bodies are configured to be connected to a fence bar and clamped together as one unit. Moreover, each of the first connecting part and the second connecting part includes a hook and a slot at two opposing sides of the first connecting part and the second connecting part. The hook of the first connecting part of one ornament body is configured to connect to the slot of the second connecting part of an adjacent accessory body.

7 Claims, 25 Drawing Sheets

(56) References Cited

U.S. PATENT DOCUMENTS

| | | | |
|---|---|---|---|
| 6,260,829 | B1 | 7/2001 | Anderson et al. |
| 7,246,792 | B2 * | 7/2007 | Leone ................. E04H 17/1443 256/22 |
| 7,341,242 | B2 * | 3/2008 | Bertato ............... E04H 17/1439 256/65.11 |
| 2007/0215851 | A1 | 9/2007 | Wall |
| 2011/0064905 | A1 | 3/2011 | Zhu |
| 2013/0273307 | A1 | 10/2013 | Hayter et al. |

OTHER PUBLICATIONS

Australian Government Examination Report No. 1 for Standard Patent Application No. 2018338119 dated Jan. 15, 2021, 6 pages.
Extended European Search Report dated Jan. 25, 2021 for European Application No. EP 18857684.7, 9 pages.

\* cited by examiner

A-A

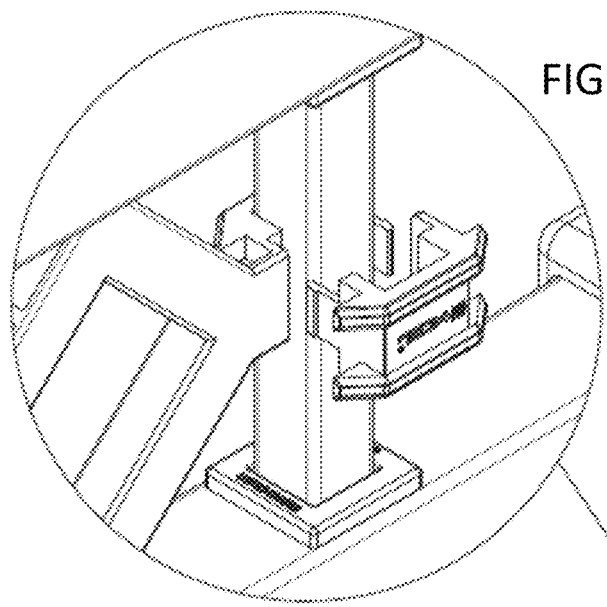
FIG. 29A
FIG. 29B
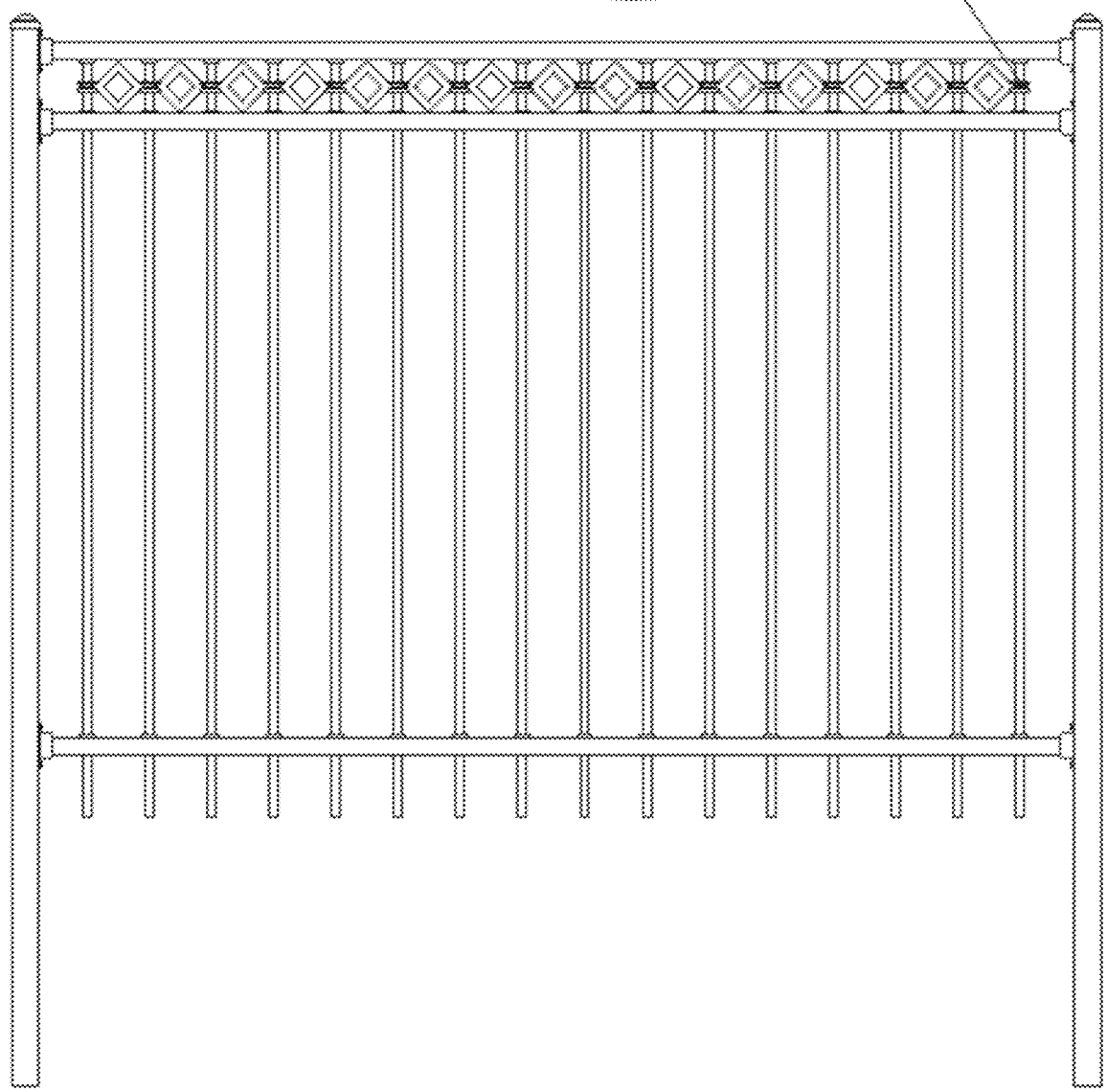

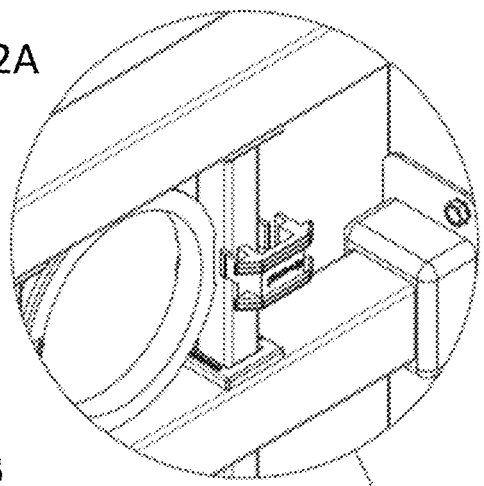
FIG. 32A
FIG. 32B
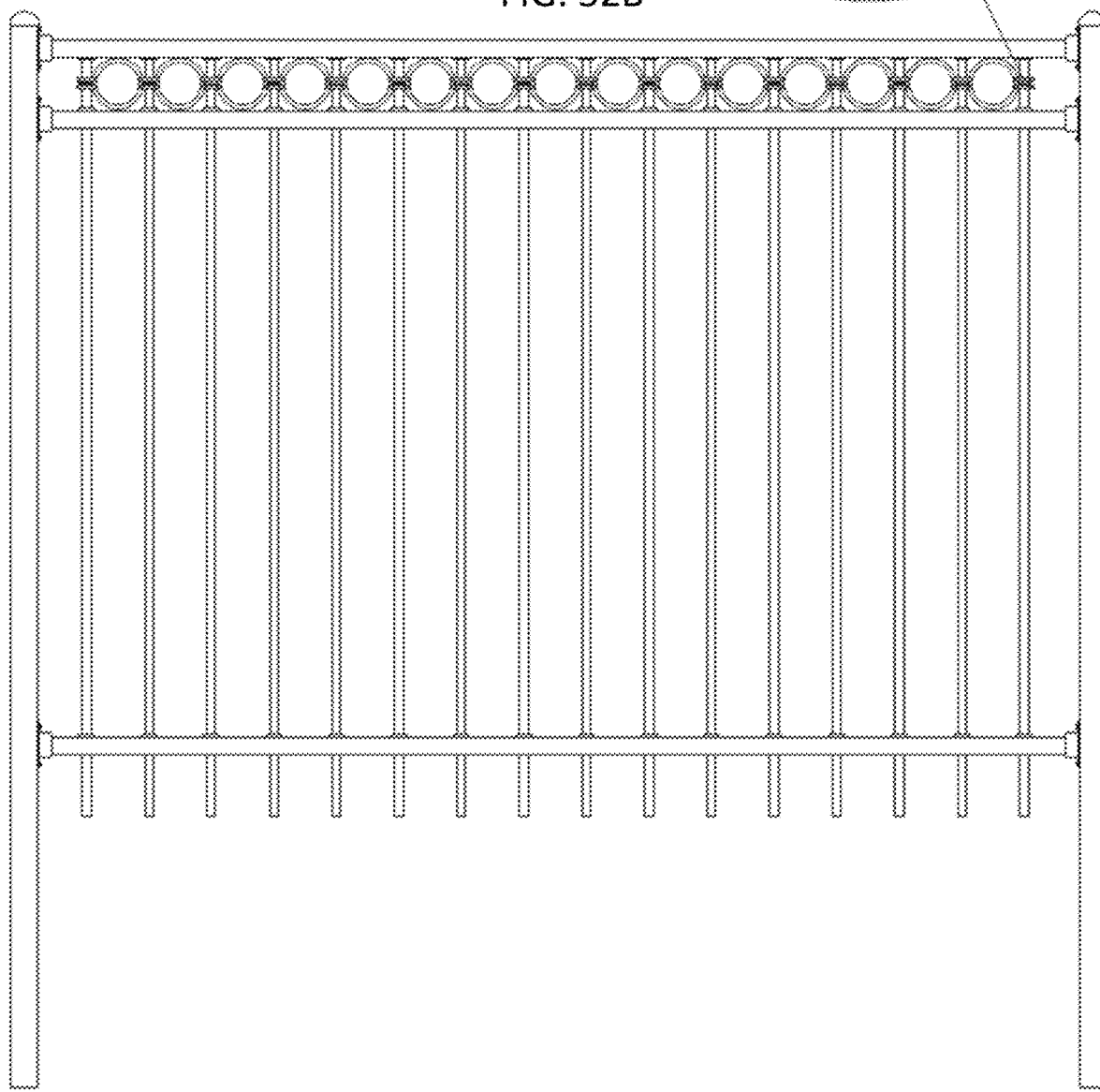

FIG. 33A
FIG. 33B
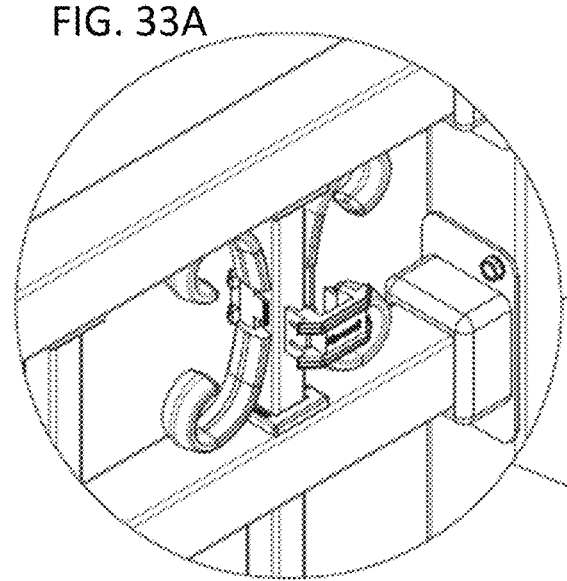
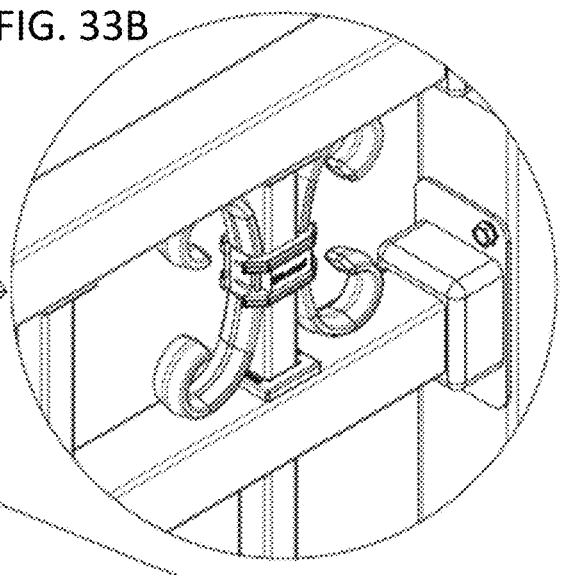
FIG. 33C
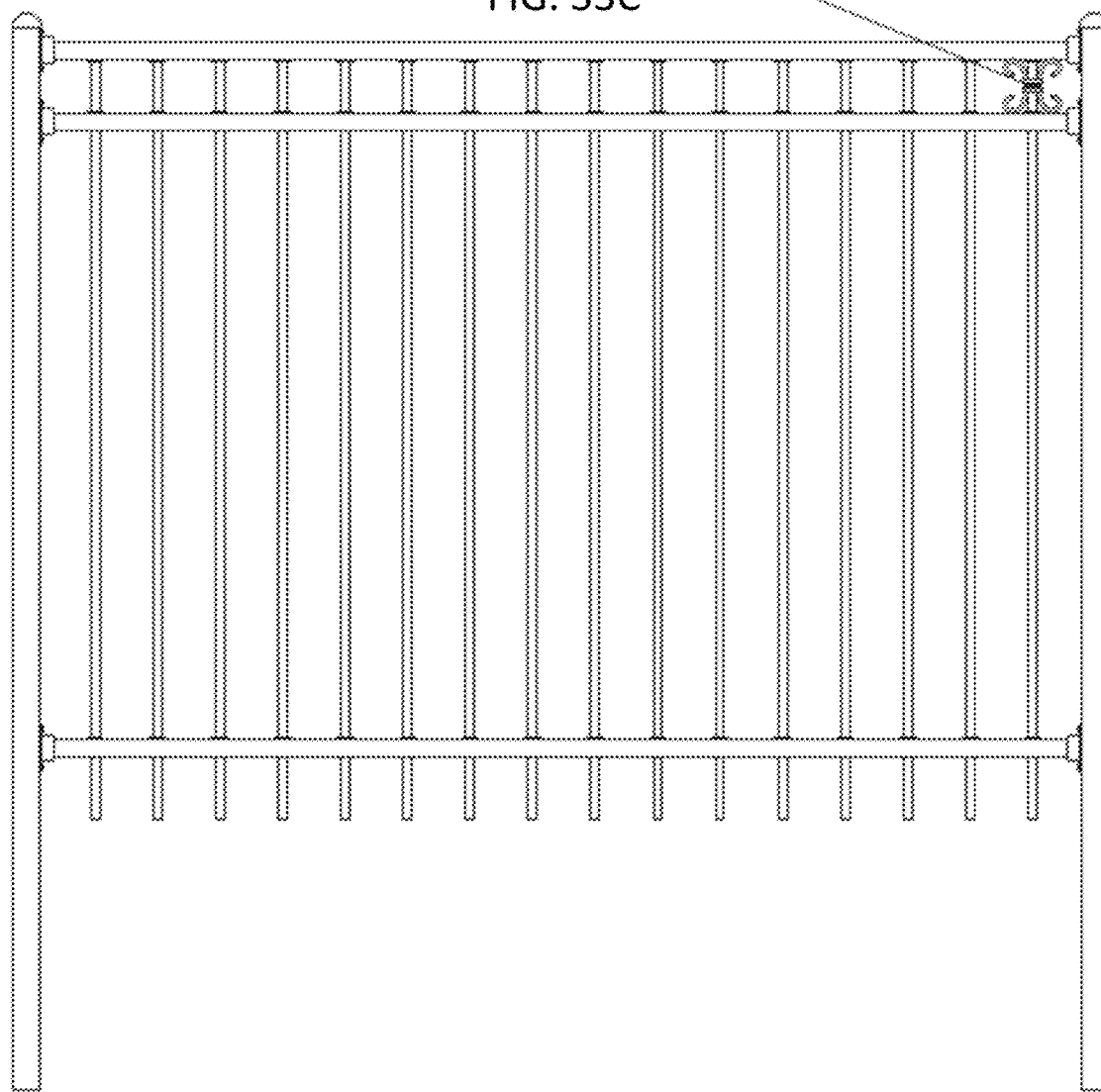

FIG. 38
FIG. 39
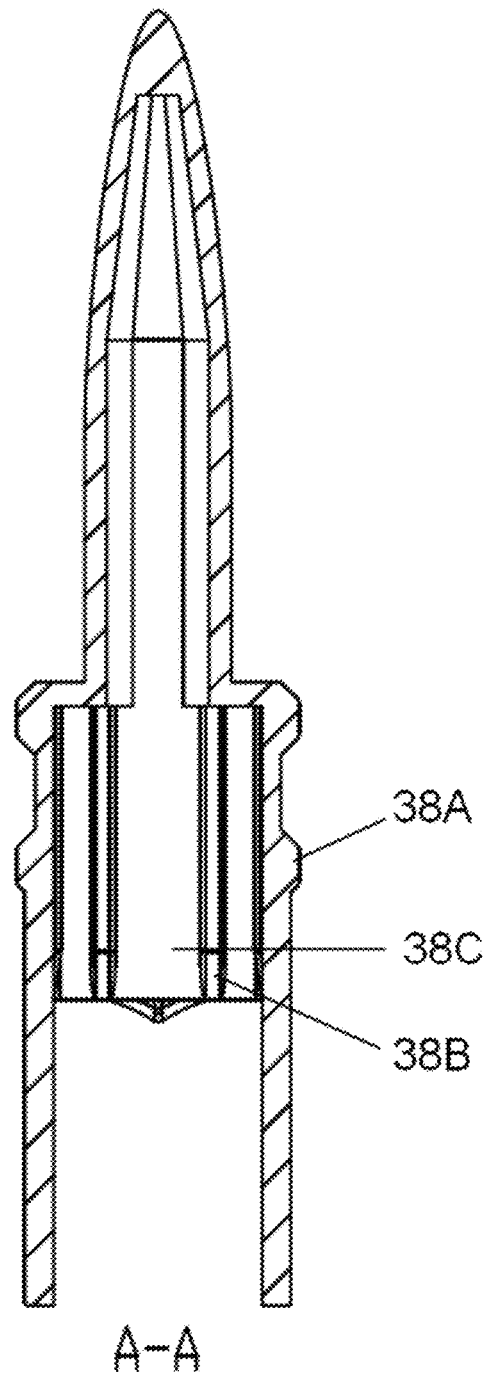
38A
38C
38B
A-A
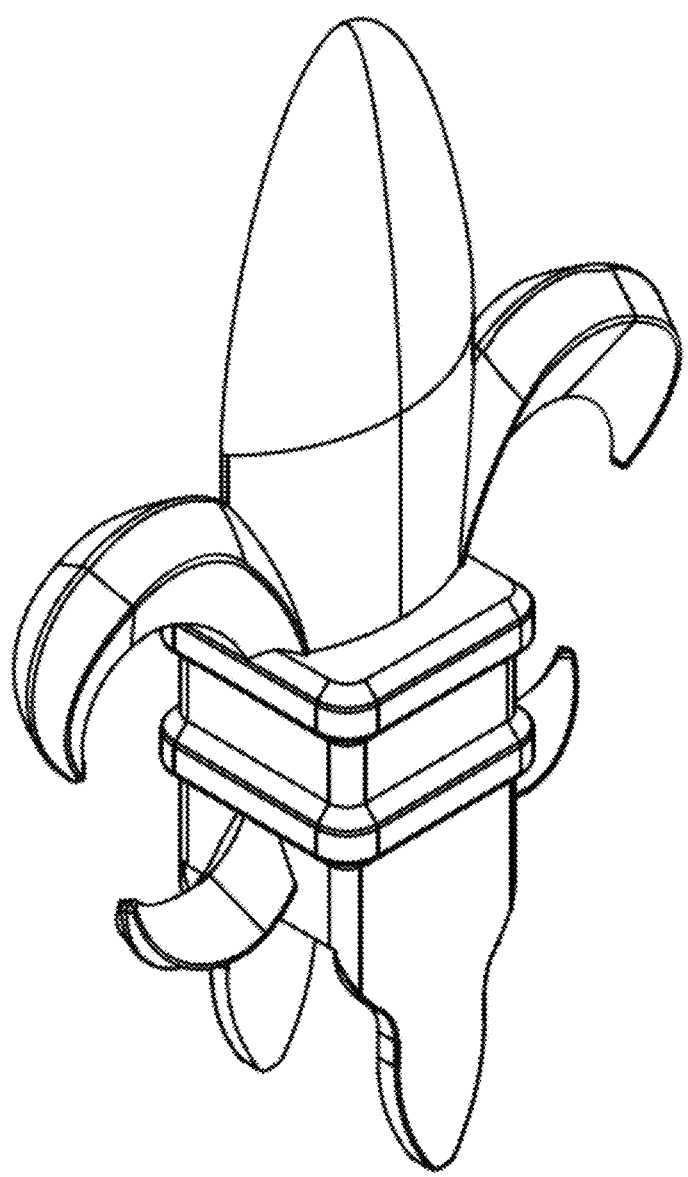

FIG. 47 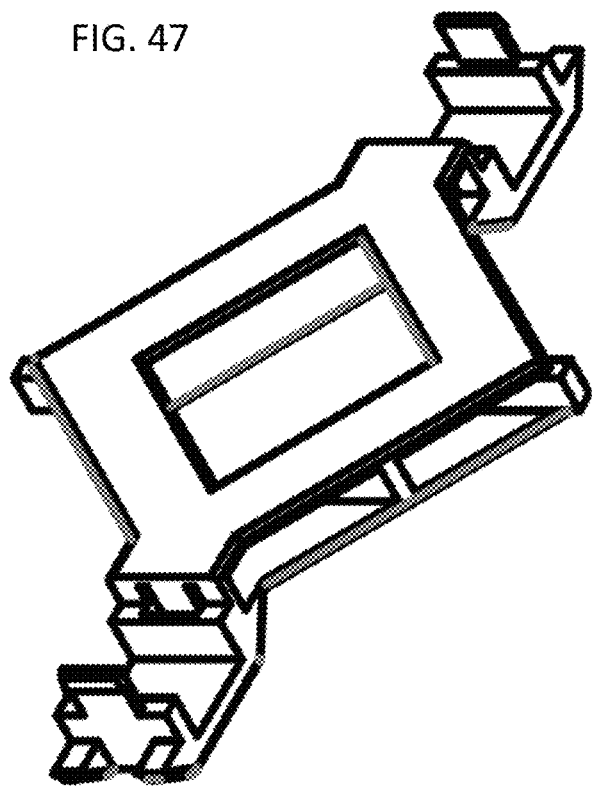 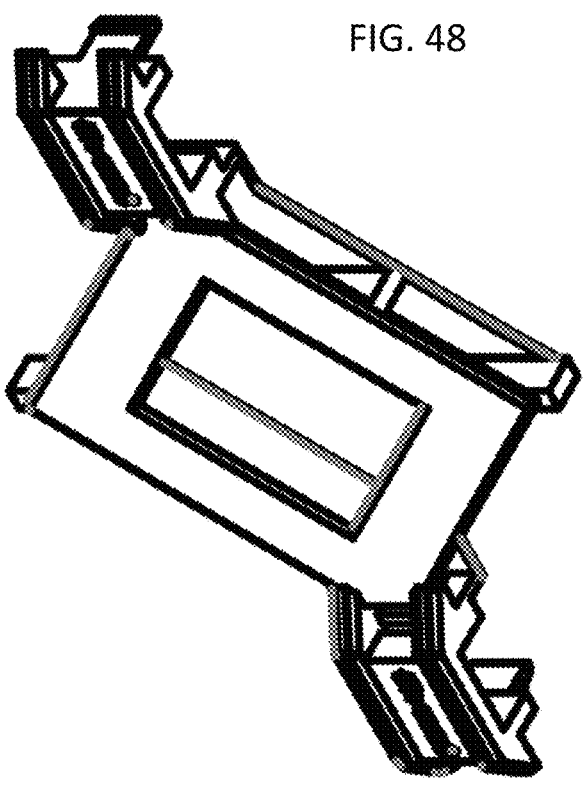 FIG. 48
FIG. 49
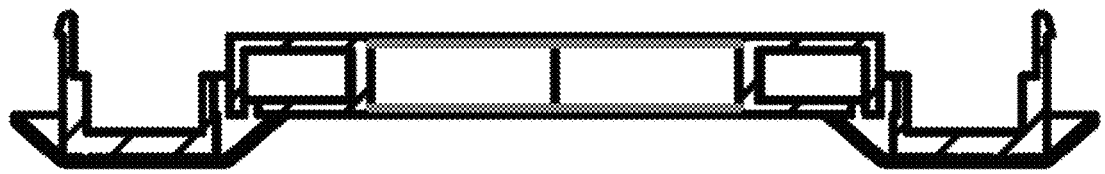
A-A

B-B

FENCE ACCESSORY

CROSS-REFERENCE TO RELATED APPLICATION

This application claims priority to and the benefit of Chinese Patent Application No. 201721213731.X, filed on Sep. 20, 2017, in the State Intellectual Property Office of the People's Republic of China, the entire content of which is incorporated herein by reference.

BACKGROUND

1. Field

The following description relates to an accessory for fence, a method of utilizing the same and a fence including the same.

2. Description of the Related Art

According to the Chinese patent application No. 200710020486.5, filed in State Intellectual Property Office of the People's Republic of China by the inventor of the present application, a fence accessory (e.g., an ornamental piece or a decorative piece) has at least two ornament bodies, and a connecting device bridging two adjacent ornament bodies, with the two ends of the connecting device joining the adjacent ornament bodies respectively. On the connecting device, an installing slot and a connecting cover plate are formed. One side of the connecting cover plate is attached to the side areas of the installing slot. The shape of the side areas of the installing slot can be a rectangular concave hole or a T-shaped concave slot. Correspondingly, to the two ends of the connecting cover plate, a bulge (e.g., a convex portion) in a rectangular shape or a T-shape can be formed. In (e.g., inside) the concave hole of the side areas of the installing slot of the ornament bodies, inner clasp can be designed to be buckled (e.g., to lock or to match) with the bulge of the connecting cover plate. For this kind of fence accessory, the special connecting cover plate is needed.

SUMMARY

Aspects according to one or more embodiments of the present invention are directed toward a fence accessory, a method of utilizing the same and a fence including the fence accessory.

Additional aspects will be set forth in part in the description which follows and, in part, will be apparent from the description, or may be learned by practice of the presented embodiments.

According to an embodiment of the present invention, a fence accessory includes at least two ornament bodies, each of the at least two ornament bodies including a first connecting part and a second connecting part at two opposing ends thereof. The first connecting part of one of the at least two ornament bodies and the second connecting part of an other one of the at least two ornament bodies are configured to be connected to a fence bar and clamped together as one unit.

Moreover, each of the first connecting part and the second connecting part includes a hook and a slot at two opposing sides of the first connecting part and the second connecting part. The hook of the first connecting part of one ornament body is configured to connect to (e.g., to be locked inside) the slot of the second connecting part of an adjacent ornament body.

The fence accessory may further include a capping block configured to lock with the first connecting part or the second connecting part of an ornament body of the at least two ornament bodies around a fence bar, e.g., an outermost fence bar.

According to another embodiment of the present invention, a method of assembling a fence accessory includes providing a plurality of fence bars and a plurality of ornament bodies, each of the plurality of ornament bodies including a first connecting part and a second connecting part at two opposing ends thereof; attaching the first connecting part of a first ornament body of the plurality of ornament bodies to a first fence bar of the plurality of fence bars; and attaching the second connecting part of a second ornament body of the plurality of ornament bodies to the first fence bar such that the first connecting part of the first ornament body and the second connecting part of the second ornament body lock with each other with the first fence bar therebetween.

The method may further include attaching the first connecting part of the second ornament body to a second fence bar of the plurality of fence bars; and attaching the second connecting part of a third ornament body of the plurality of ornament bodies to the second fence bar such that the first connecting part of the second ornament body and the second connecting part of the third ornament body lock with each other with the second fence bar therebetween.

The method may further include attaching the second connecting part of a fourth ornament body of the plurality of ornament bodies to an outermost fence bar, and attaching a capping block to the outermost fence bar such that the second connecting part of the fourth ornament body locks with the capping block with the third fence bar therebetween.

According to another embodiment of the present disclosure, a fence includes a plurality of fence bars; and a fence accessory. The fence accessory includes at least two ornament bodies, each of the at least two ornament bodies including a first connecting part and a second connecting part at two opposing ends thereof. The first connecting part of one of the at least two ornament bodies and the second connecting part of an other one of the at least two ornament bodies are configured to be connected to a fence bar of the plurality of fence bars and clamped together as one unit.

According to another embodiment of the present disclosure, a fence accessory includes an ornament body including a single connecting part, and a capping block configured to be locked with the ornament body.

According to another embodiment of the present disclosure, a method of assembling a fence accessory includes attaching an ornament body to a first fence bar of a plurality of fence bars, the ornament body including a single connecting part; and attaching a capping block to the first fence bar such that the single connecting part of the ornament body and the capping block lock with each other around the first fence bar.

According to another embodiment of the present disclosure, a fence includes a plurality of fence bars; and a fence accessory. The fence accessory includes an ornament body including a single connecting part, and a capping block configured to be locked with the ornament body.

According to another embodiment of the present disclosure, a fence accessory includes an opening configured to be locked with a fence bar.

According to another embodiment of the present disclosure, a method of assembling a fence accessory includes attaching the fence accessory to a fence bar, wherein the fence accessory includes an opening configured to be locked with the fence bar.

The fence accessory according to one or more embodiments of the present disclosure directly connects the connecting parts of the ornament bodies, and installs capping blocks at both ends of the ornament chain (e.g., a series of ornament bodies). Compared with related art utilizing a separate cover plate, the fence accessory according to one or more embodiments of the present disclosure can save a lot of working hours during the assembly stage.

BRIEF DESCRIPTION OF THE DRAWINGS

These and/or other aspects will become apparent and more readily appreciated from the following description of the embodiments, taken in conjunction with the accompanying drawings in which:

FIG. 11 is a top plan view of the butterfly shaped ornament body;

FIG. 12 is a front side view thereof;
FIG. 13 is a left side view thereof;
FIG. 14 is a right side view thereof;
FIG. 15 is a bottom plan view thereof;
FIG. 16 is a rear side view thereof;
FIG. 17 is a schematic 3-dimensional front view of the butterfly shaped ornament body; and
FIG. 18 is a schematic 3-dimensional rear view of the butterfly shaped ornament body.

FIG. 19 is a top plan view of the capping block;
FIG. 20 is a front side view thereof;
FIG. 21 is a left side view thereof;
FIG. 22 is a right side view thereof;
FIG. 23 is a bottom plan view thereof;
FIG. 24 is a rear side view thereof;
FIG. 25 is a schematic 3-dimensional front view of the capping block;
and
FIG. 26 is another schematic 3-dimensional front view of the capping block.

FIGS. 27A-29B schematically illustrate a process of assembling a diamond shaped fence accessory.

FIGS. 30A-32B schematically illustrate a process of assembling a ring shaped fence accessory.

FIGS. 33A-34 schematically illustrate a process of assembling a butterfly shaped fence accessory.

FIGS. 35-39 show various views of a fence accessory according to one embodiment of the present invention, where
FIG. 35 is a front view of the accessory;
FIG. 36 is a top view thereof;
FIG. 37 is a bottom view thereof;
FIG. 38 is a sectional view cutting along the line A-A of FIG. 35;
FIG. 39 is a schematic 3-dimensional front view of the accessory.

FIGS. 41-49 show various views of a diamond shaped ornament body according to one embodiment of the present invention, where
FIG. 41 is a top plan view of the diamond shaped ornament body;
FIG. 42 is a front side view thereof;
FIG. 43 is a left side view thereof;
FIG. 44 is a right side view thereof;
FIG. 45 is a bottom plan view thereof;
FIG. 46 is a rear side view thereof;
FIG. 47 is a schematic 3-dimensional front view of the diamond shaped ornament body; and
FIG. 48 is a schematic 3-dimensional rear view of the diamond shaped ornament body.
FIG. 49 is a cross sectional view of the diamond shaped ornament body cutting along the line A-A of FIG. 41.

FIG. 50 is a top plan view of the ring shaped ornament body;
FIG. 51 is a front side view thereof;
FIG. 52 is a left side view thereof;
FIG. 53 is a right side view thereof;
FIG. 54 is a bottom plan view thereof;
FIG. 55 is a rear side view thereof;
FIG. 56 is a schematic 3-dimensional front view of the ring shaped ornament body;
and
FIG. 57 is a schematic 3-dimensional rear view of the ring shaped ornament body.
FIG. 58 is a cross sectional view of the ring shaped ornament body cutting along the line B-B of FIG. 50.

Figure 1:
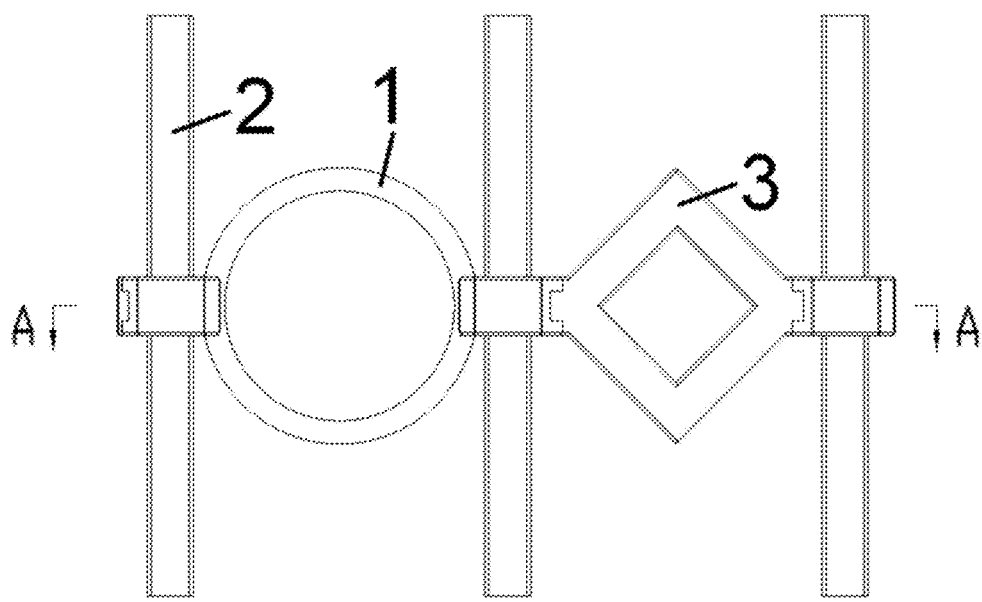
FIG. 1 is a schematic illustration of a fence accessory assembly.

In the drawings, some of the reference numerals are:
1—the first ornament body, 2—vertical bar, 3—the second ornament body, 4—capping block, 5A—the first connecting part, 5B—the second connecting part, 6A—hook of the second connecting part, 6B—slot of the second connecting part, 7A—hook of the first connecting part, 7B—slot of the first connecting part, 10—ornament body, 11—connecting part, 12A—hook of the connecting part, 12B—slot of the connecting part, 13A—hook of the capping block, 13B—slot of the capping block.

DETAILED DESCRIPTION

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." It will be further understood that the terms "comprises" and/or "comprising" used herein specify the presence of the stated features or components, but do not preclude the presence or addition of one or more other features or components.

Aspects of the present invention will be described in more detail in conjunction with the accompanying drawings. Like reference numerals in the drawings denote like elements. Sizes of components in the drawings may be exaggerated for convenience of explanation. In other words, since sizes and thicknesses of components in the drawings are arbitrarily illustrated for convenience of explanation, the following embodiments are not limited thereto.

Referring to FIGS. 1-6, a fence accessory includes at least two ornament bodies 1 and 3. A first connecting part 5A and a second connecting part 5B are installed at two opposing ends of each of the ornament bodies 1 and 3. The first connecting part 5A of one ornament body (e.g., ornament body 3) and the second connecting part 5B of an adjacent ornament body (e.g., ornament body 1) are connected to the vertical bar 2 (e.g., vertical fence bar) and clamped (e.g., locked) together as one unit. For example, when the first connecting part 5A of ornament body 3 and the second connecting part 5B of ornament body 1 are clamped together with the vertical fence bar 2 in the middle, the outer contour (e.g., the cross section) of the vertical fence bar 2 matches with the shape (e.g., the cross section) of the opening formed by the combination of the first and second ornament bodies. The first connecting part 5A of ornament body 3, the second connecting part 5B of ornament body 1, the vertical fence bar 2 are tightly bound together and not able to move relative to one another. This configuration is repeated between adjacent ornament bodies until all ornament bodies are connected together, e.g., to form an ornament chain. For the outmost first connecting part 5A' and second connecting part 5B' (i.e., the connecting part that is located at the end of the ornament chain without an adjacent connecting part to be clamped with), they each are clamped to a single capping block 4, respectively.

Figure 5:
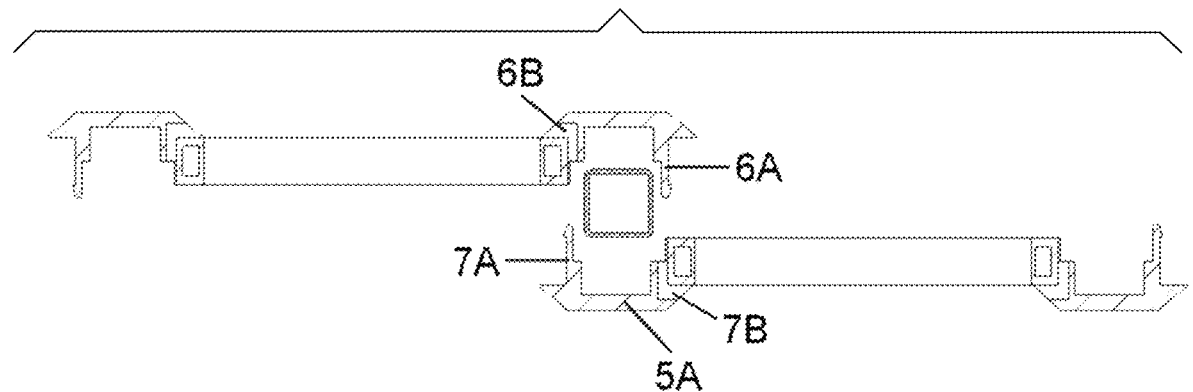
FIG. 5 illustrates the decomposition view of FIG. 2.
Figure 6:
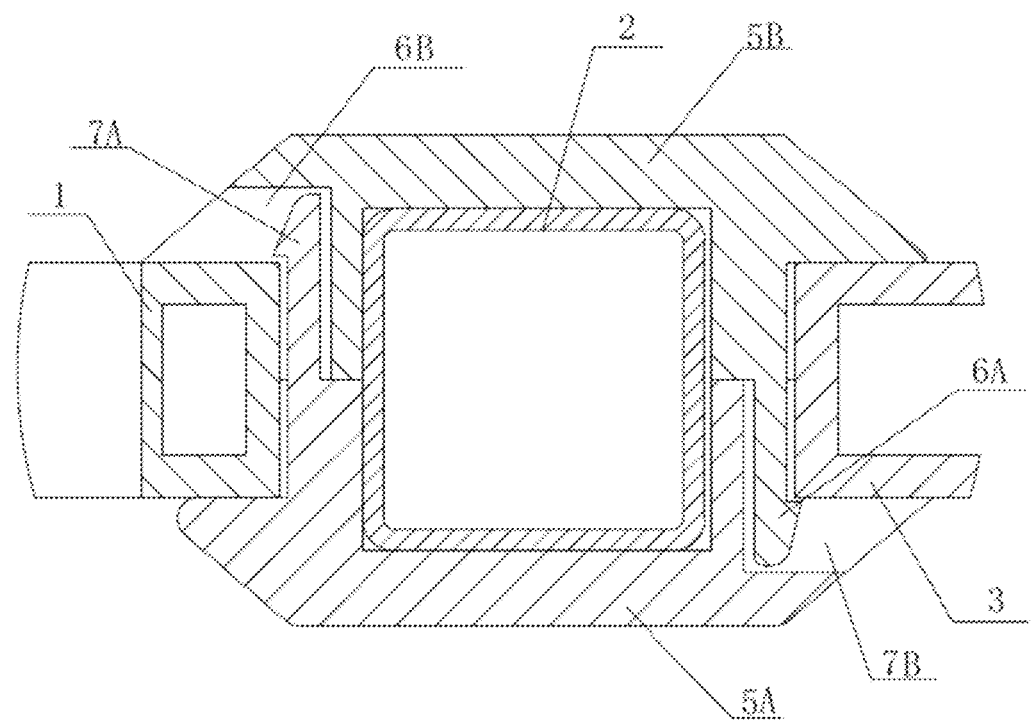
FIG. 6 is the close-up view of section I in FIG. 2.
Figure 7:
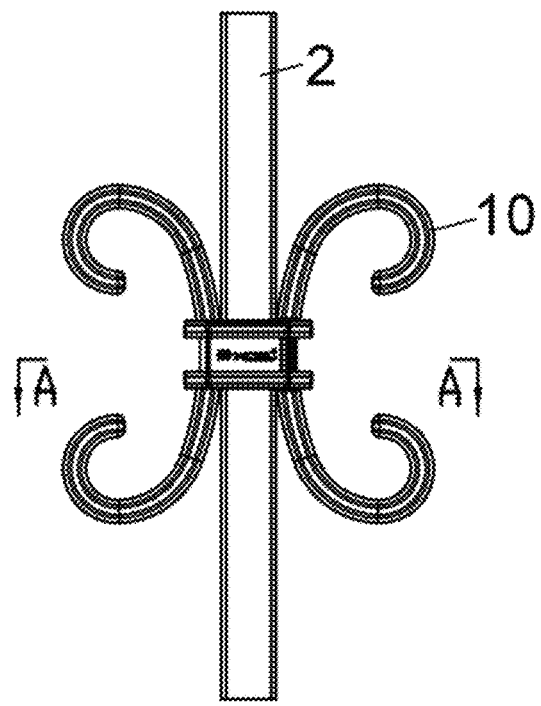
FIG. 7 is a schematic illustration of a fence accessory assembly.
Figure 8:
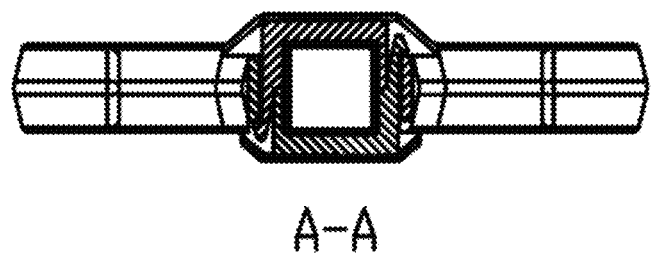
FIG. 8 is the overhead view of the fence accessory assembly of FIG. 7.
Figure 9:
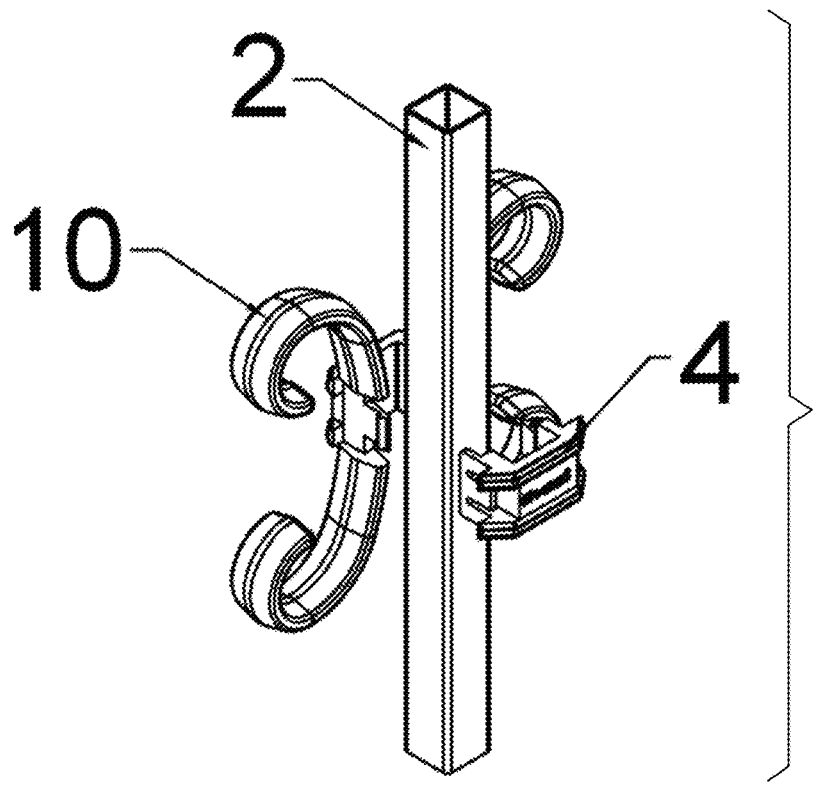
FIG. 9 illustrates the decomposition view of the fence accessory assembly of FIG. 7.

Moreover, referring to FIGS. 5 and 6, a hook 7A and a slot 7B are installed (e.g., formed) at two opposing sides of the first connecting part 5A, and a hook 6A and a slot 6B are installed (e.g., formed) at two opposing sides of the second connecting part 5B. Here, the hook 7A and the slot 7B may be separated from each other by a distance such that the vertical fence bar can be accommodated there between. For example, the first connecting part 5A may have a U-shape with the hook 7A and the slot 7B formed at the outer edges of the two legs of the U, and the vertical fence bar is to be accommodated in the space defined by the U-shape. For example, when the vertical fence bar has a rectangular cross section, the first connecting part 5A of ornament body 3 and the second connecting part 5B of ornament body 1 clamp together to form a rectangular shaped space in the middle that fits snugly around the fence bar. However, the present invention is not limited thereto and any suitable design of the connecting part may be utilized.

The hook 7A of the first connecting part 5A of one ornament body (e.g., the first ornament body 1) connects to (e.g., is configured to be locked inside) the slot 6B of the second connecting part 5B of an adjacent ornament body (e.g., the second ornament body 3). Here, the hook 7A is inserted (e.g., through compression on or squeezing of the hook) into the slot 6B of an adjacent connecting part and is locked inside the slot 6B so that it does not slip out of the slot 6B. The capping block may have a structure resembling that of the first connecting part or the second connecting part of the ornament body to be locked with the second connecting part or the first connecting part of a corresponding ornament body.

With the above described structure, the fence accessory according to one or more embodiments of the present disclosure directly connects the connecting parts of neighboring accessory bodies, rather than utilizing separate cover plates. Further, capping blocks are provided at both ends of the accessory chain. Therefore, assembling the presently described fence accessories on the fence is convenient and can save a lot of working hours.

According to another embodiment of the present disclosure, a method of assembling fence accessories on a fence includes providing a plurality of ornament bodies including a first ornament body 1 and a second ornament body 3, where a first connecting part 5A and a second connecting part 5B are installed (e.g., formed) at two opposing ends of each of the ornament bodies 1 and 3. The method further includes attaching the first connecting part 5a of the first ornament body 1 to a vertical fence bar 2, and (e.g., concurrently or sequentially) attaching the second connecting part 5B of the second ornament body 3 to the same vertical fence bar 2 such that the first connecting part 5A of the first ornament body 1 and the second connecting part 5B of the second ornament body 3 lock with each other with the vertical fence bar 2 tightly fit inside a space formed in the middle of the locked first connecting part 5A of the first ornament body 1 and the second connecting part 5B of the second ornament body 3. For example, the fence bar, the first connecting part 5A of the first ornament body 1 and the second connecting part 5B of the second ornament body 3 are not able to move relative to one another. The method further includes attaching the first connecting part of an ornament body to an outermost vertical fence bar, and attaching a capping block such that the first connecting part 5A of this ornament body locks with the capping block with the outermost vertical fence bar tightly fit inside a space formed in the middle of the locked first connecting part 5A and the capping block.

Figure 2:
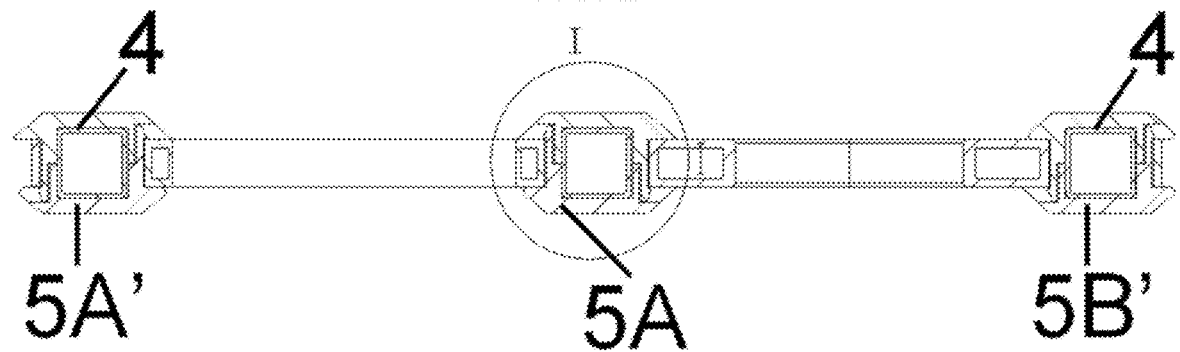
FIG. 2 is the overhead view of the fence accessory assembly of FIG. 1.
Figure 3:
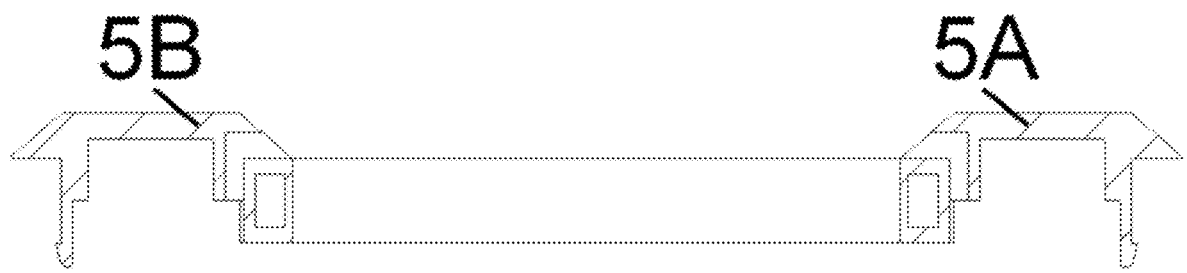
FIG. 3 is a schematic illustration of a single ornament body.
Figure 4:
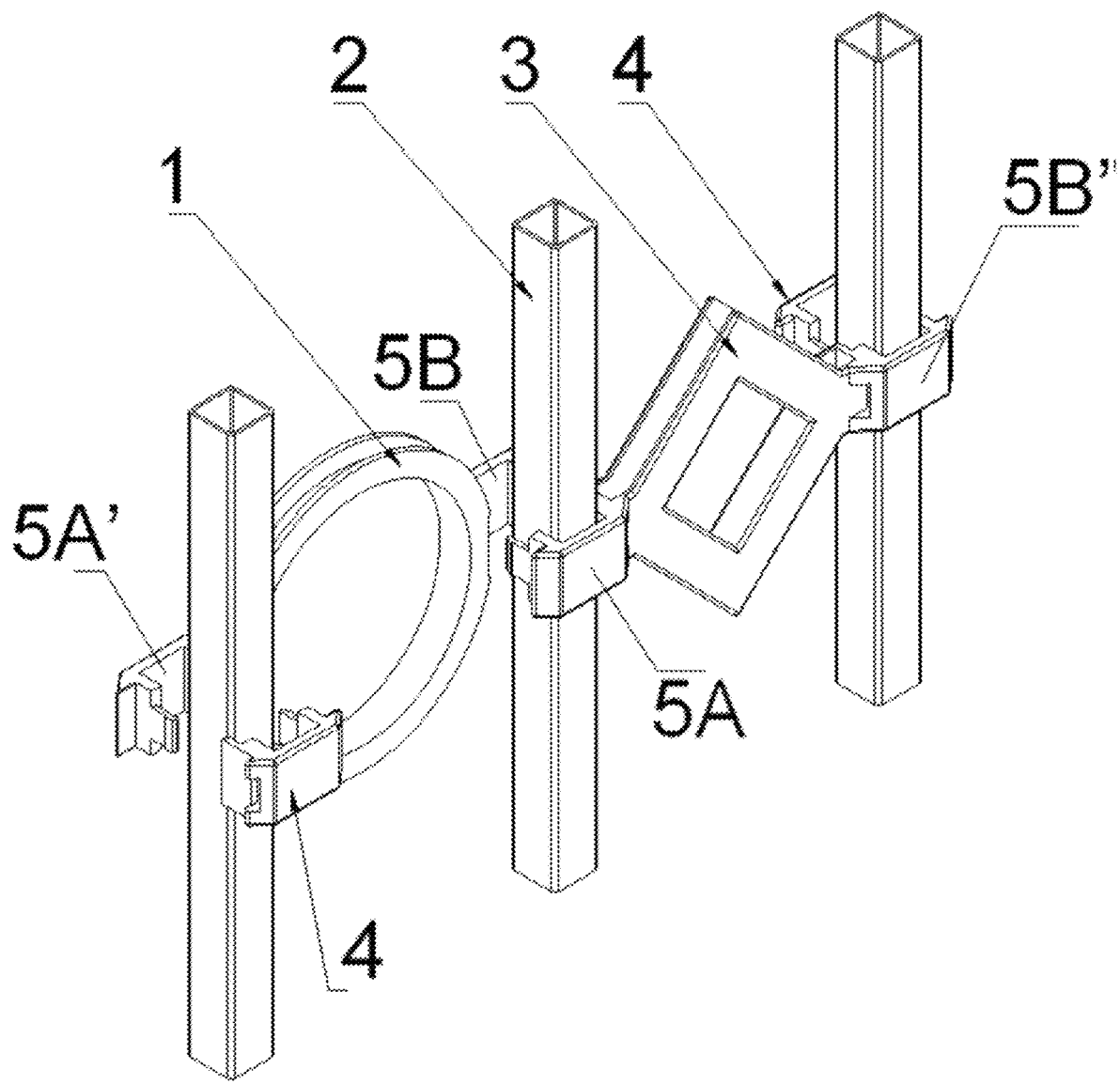
FIG. 4 illustrates the decomposition view of the fence accessory assembly of FIG. 1.

Referring to FIGS. 1 and 2, an assembled fence includes a plurality of vertical fence bars 2, and an ornament body (1 or 3) between two adjacent vertical fence bars. The ornament body includes a first connecting part 5A and a second connecting part 5B at two opposing ends of the ornament body. The first connecting part 5A of one ornament body and the second connecting part 5B of an adjacent ornament body are connected to the vertical fence bar 2 and clamped together as one unit. For example, when the first connecting part 5A of ornament body 3 and the second connecting part 5B of ornament body 1 are clamped together with the vertical fence bar 2 in the middle, the outer contour of the vertical fence bar 2 matches with the opening formed by the combination of the first and second ornament bodies. This configuration is repeated between adjacent ornament bodies. For the outmost first connecting part 5A' and second connecting part 5B' (i.e., the connecting part that is located at the end of the ornament chain without an adjacent connecting part to be clamped with), they each are clamped to a single capping block 4, respectively.

While ornament bodies having a first connecting part and a second connecting part installed at two opposing ends thereof have been described, the present invention is not limited thereto. According to an embodiment, an ornament body may include a single connecting part that is configured to be clamped with a capping block. The single connecting part may be located in the middle or toward a side of the ornament body.

FIGS. 7-10 illustrate a fence accessory assembly including an ornament body having a single connecting part. Referring to FIGS. 7-10, a fence accessory includes an ornament body 10. The ornament body 10 includes a single connecting part 11 installed in the middle thereof. The connecting part 11 of the ornament body 10 is connected to the vertical bar 2 (e.g., vertical fence bar) and clamped (e.g., locked) together with a capping block 4 to enclose the vertical fence bar 2 in the middle, the outer contour (e.g., the cross section) of the vertical fence bar 2 matches with the shape (e.g., the cross section) of the opening formed by the combination of the ornament body 10 and the capping block 4. This configuration is repeated for each targeted fence bar to form an accessory chain.

Figure 10:
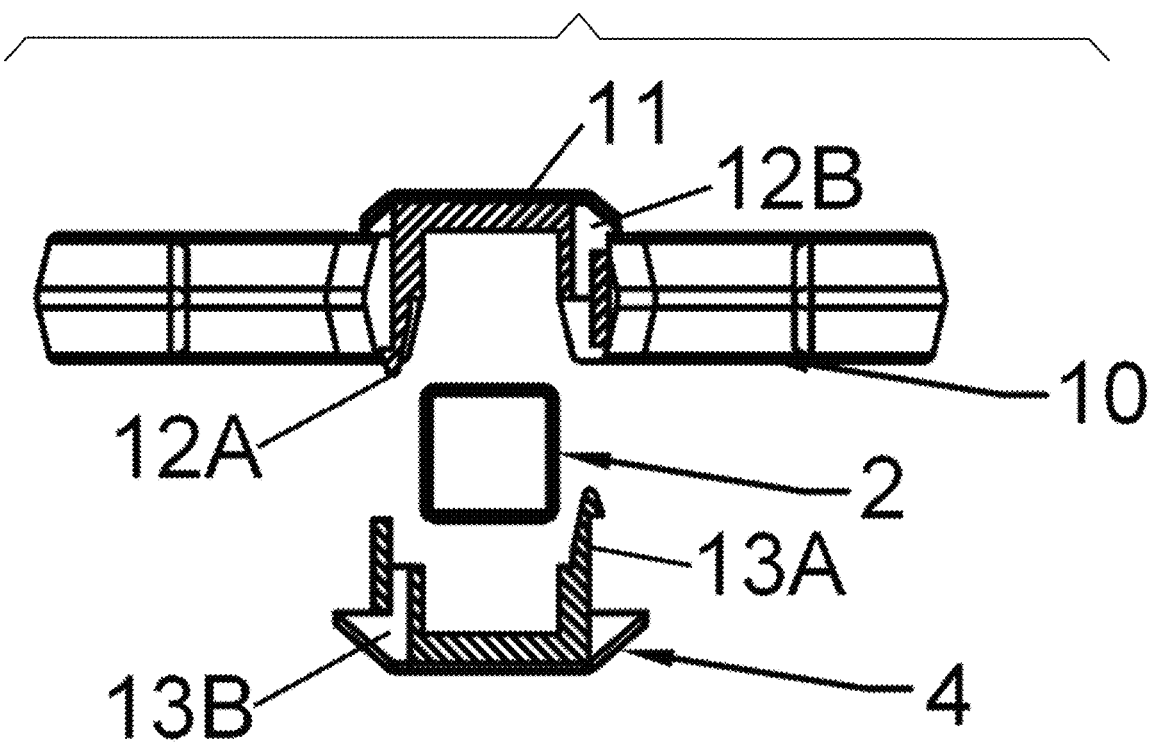
FIG. 10 illustrates the decomposition view of FIG. 8.
Figure 11:
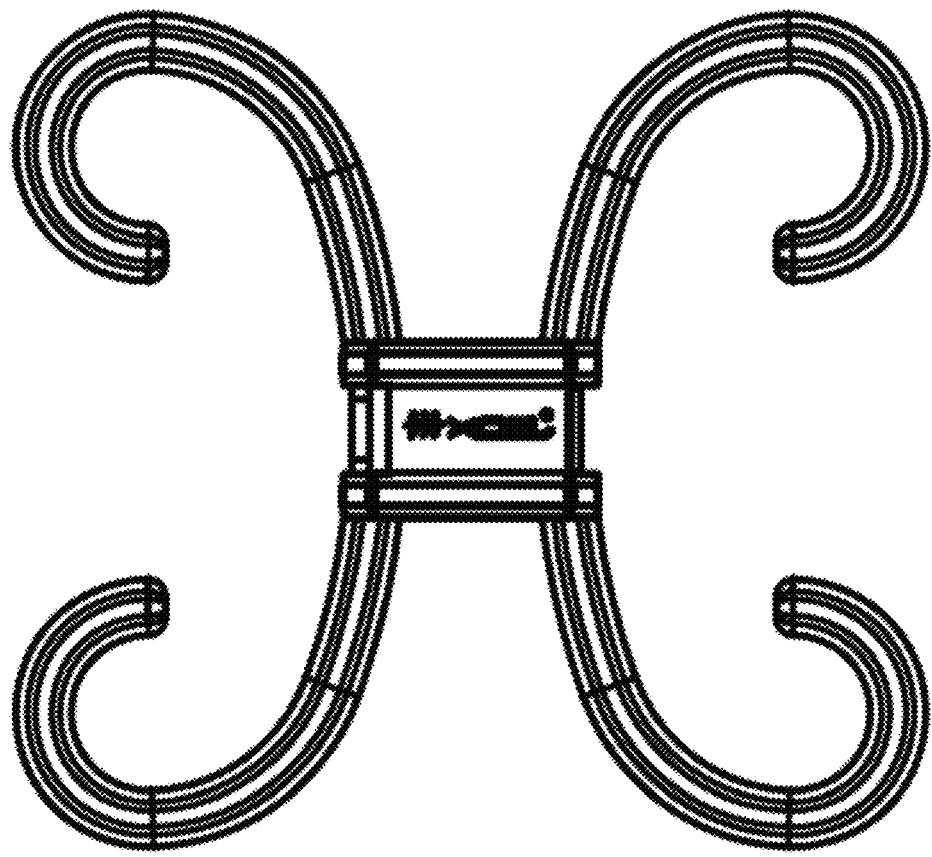
FIGS. 11-18 show various views of a butterfly shaped ornament body according to one embodiment of the present invention, where
Figure 12:
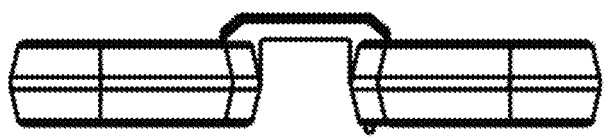
Figure 13:
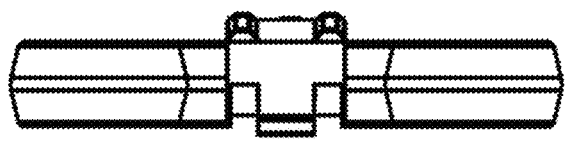
Figure 14:
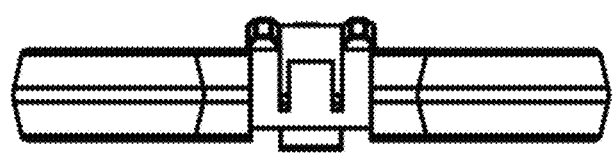
Figure 15:
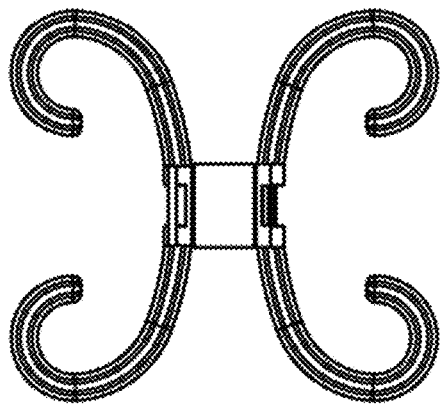
Figure 16:
Figure 17:
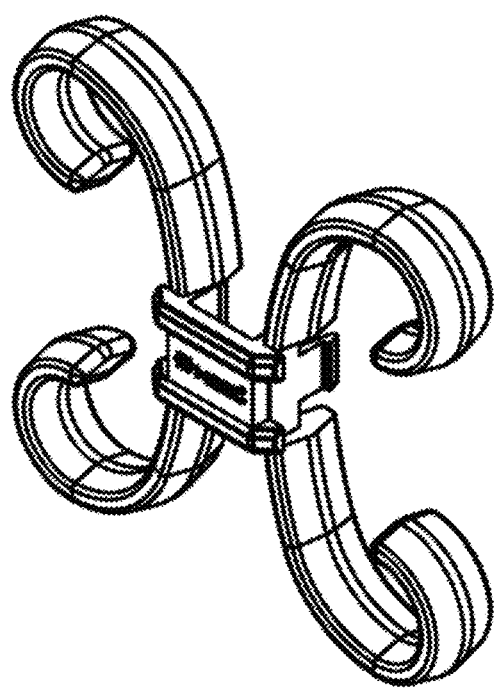
Figure 18:
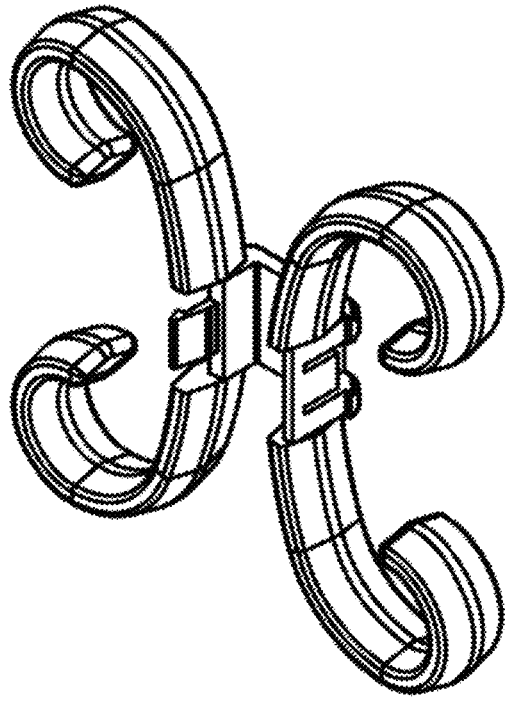
Figure 19:
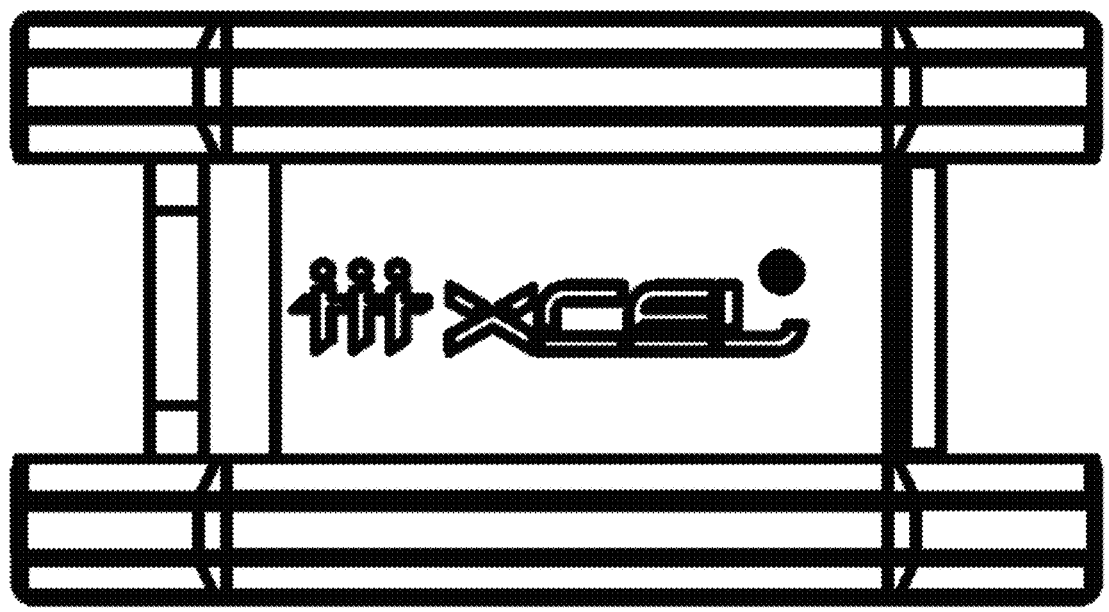
FIGS. 19-26 show various views of a capping block according to one embodiment of the present invention, where
Figure 20:
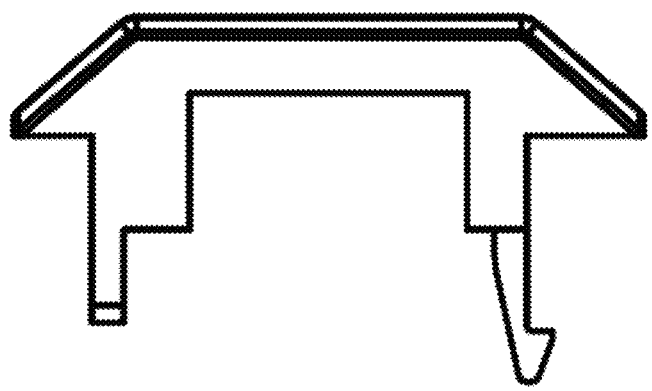
Figure 21:
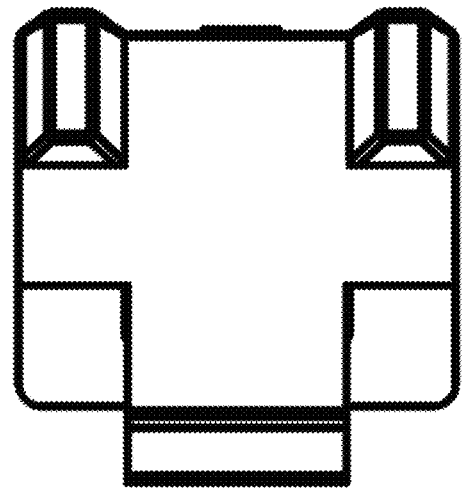
Figure 22:
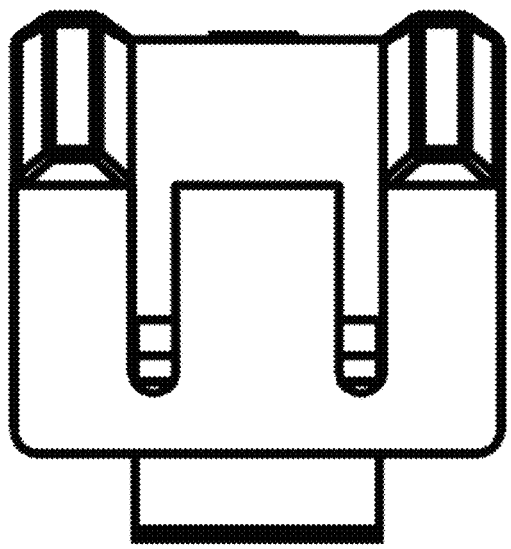
Figure 23:
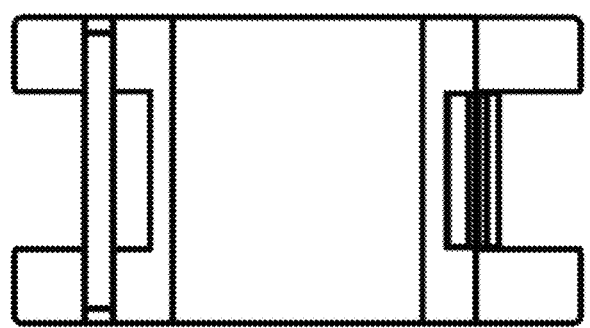
Figure 24:
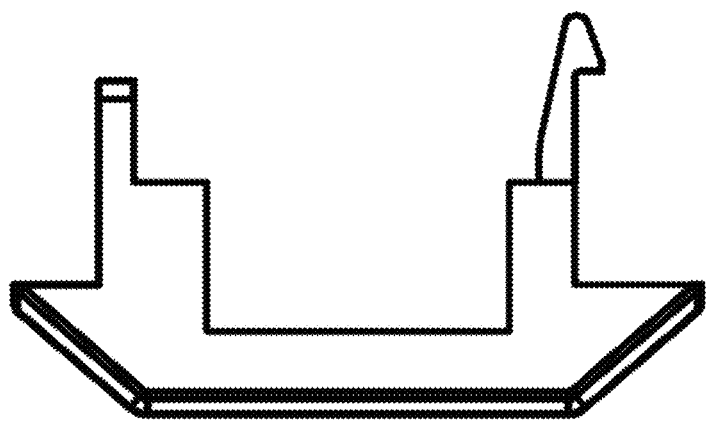
Figure 25:
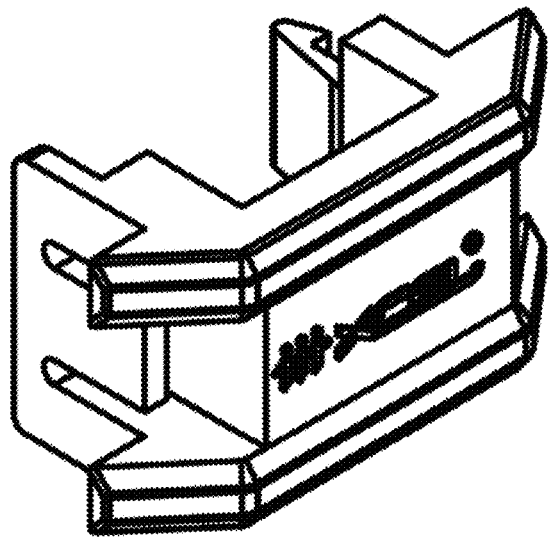
Figure 26:
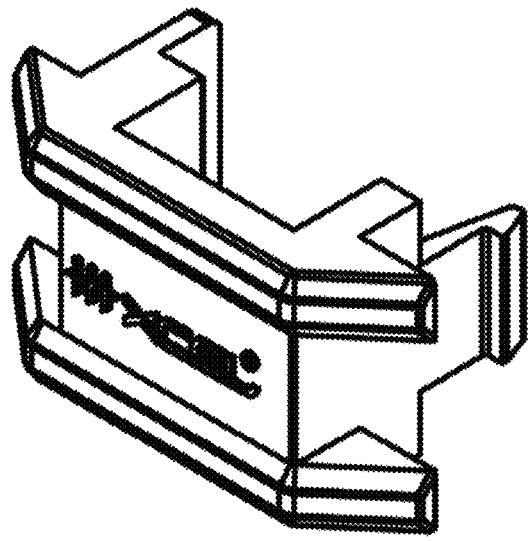

Further, referring to FIG. 10, a hook 12A and a slot 12B are formed at two opposing sides of the connecting part 11, and a hook 13A and a slot 13B are formed at two opposing sides of the capping block 4. Here, the hook 12A and the slot 12B may be separated from each other by a distance such that the vertical fence bar can be accommodated there between. For example, the connecting part 11 may have a U-shape with the hook 12A and the slot 12B formed at the outer edges of the two legs of the U, and the vertical fence bar is to be accommodated in the space defined by the U-shape. For example, when the vertical fence bar has a rectangular cross section, the connecting part 11 of ornament body 10 and the capping block 4 clamp together to form a rectangular shaped space in the middle that fits snugly (e.g., under an interference fit) around the fence bar. However, the present invention is not limited thereto and any suitable design of the connecting part may be utilized.

The hook 12A of the connecting part 11 of the ornament body 10 connects to (e.g., is configured to be locked inside) the slot 13B of the capping block 4. Here, the hook 12A is inserted (e.g., through compression on or squeezing of the hook) into the slot 13B of the capping block and is locked inside the slot 13B so that it does not slip out of the slot 13B.

The fence accessory may have various suitable designs. FIGS. 11-18 show various views of a butterfly shaped fence accessory according to one embodiment of the present invention. FIGS. 19-26 show various views of a capping block according to one embodiment of the present invention. FIGS. 41-49 show various views of a diamond shaped ornament body according to one embodiment of the present invention. FIGS. 50-58 show various views of a ring shaped ornament body according to one embodiment of the present invention.

Figure 27A:
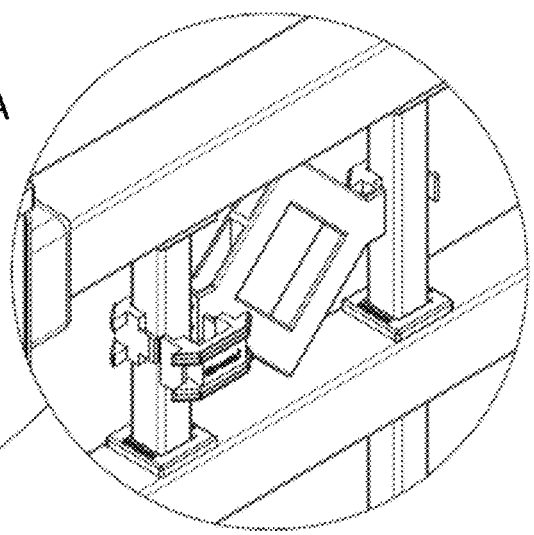
Figure 27B:
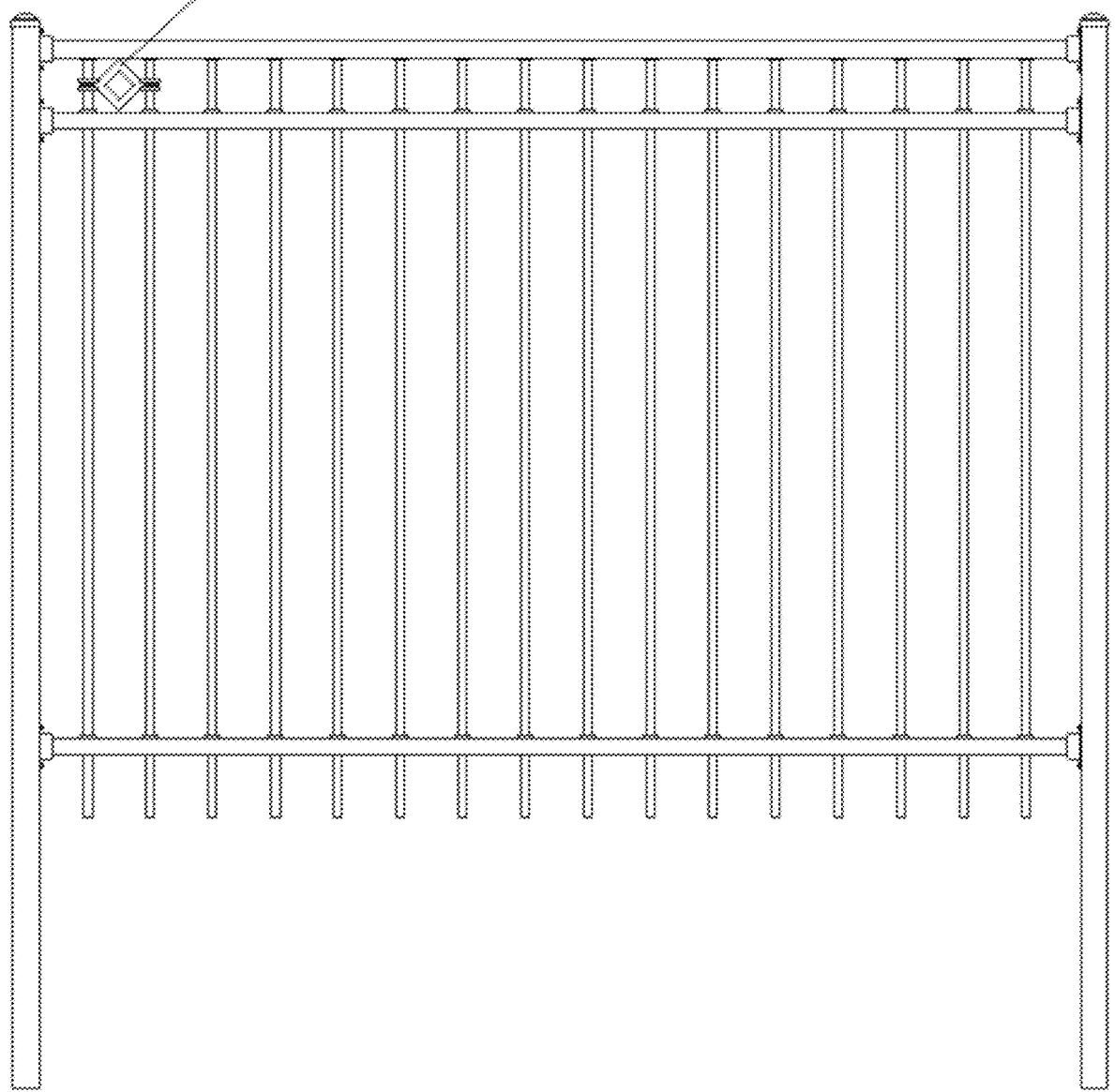
Figure 28A:
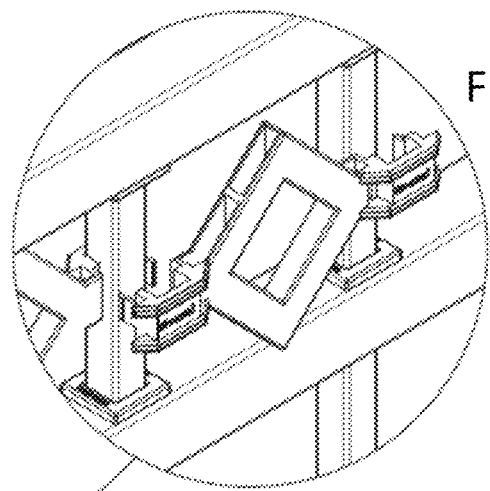
Figure 28B:
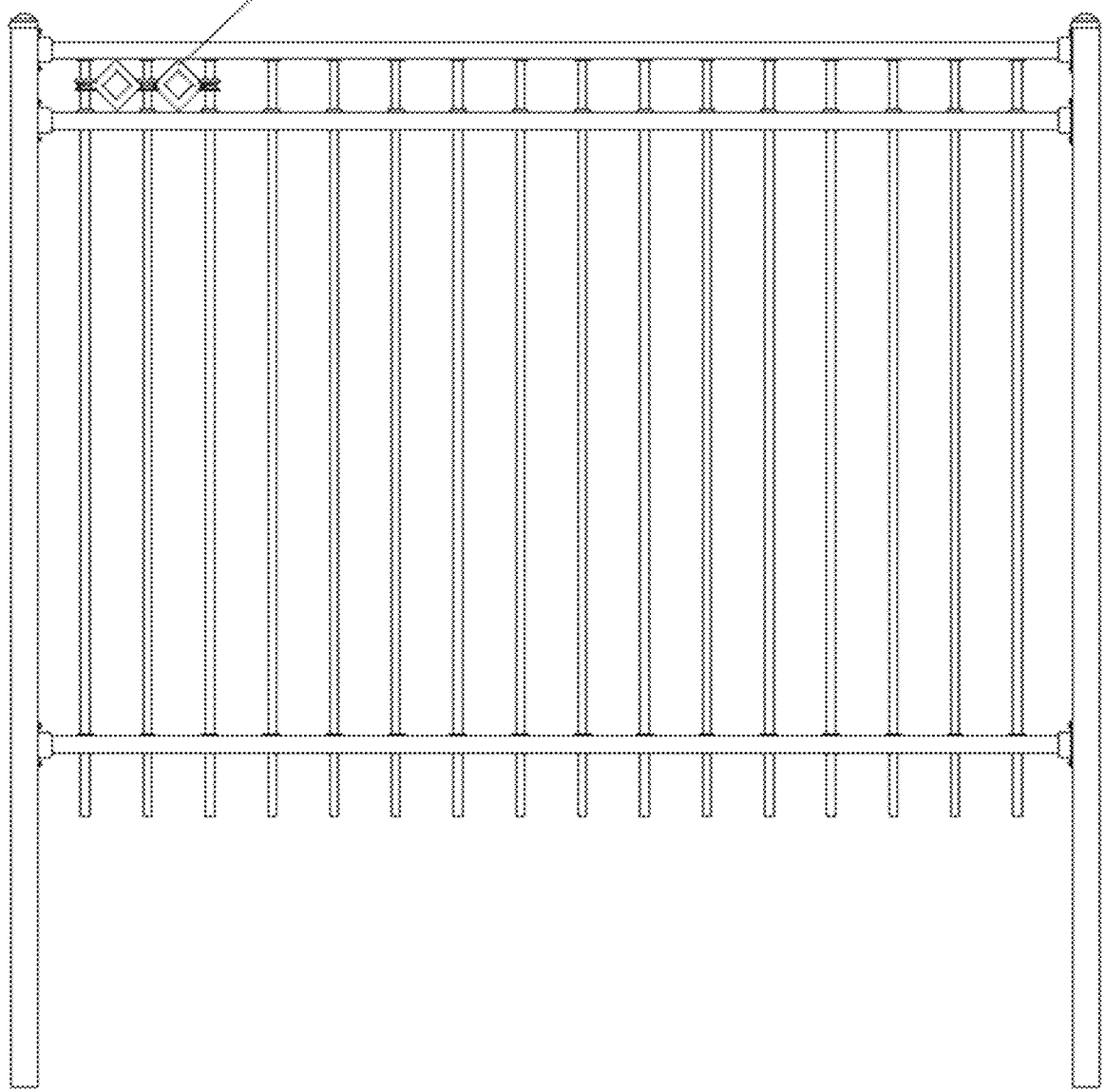
Figure 30A:
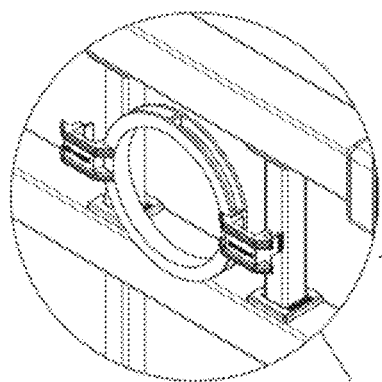
Figure 30B:
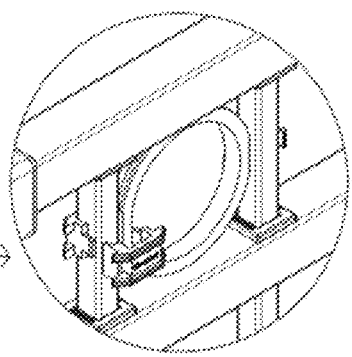
Figure 30C:
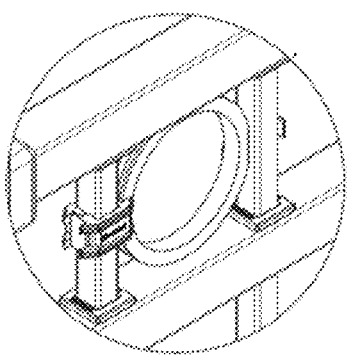
Figure 30D:
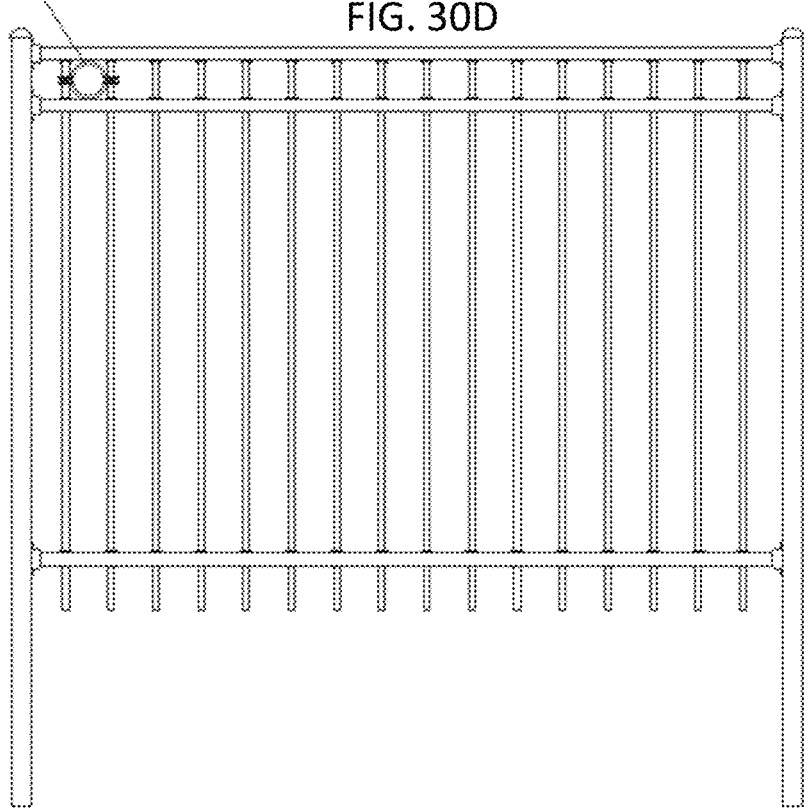
Figure 31A:
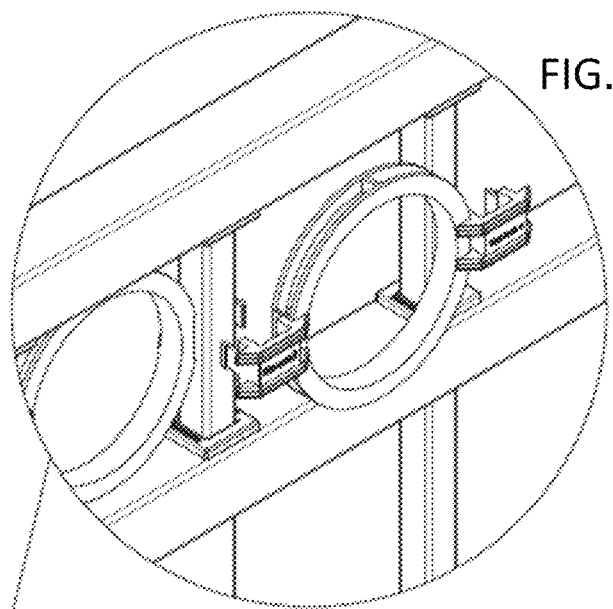
Figure 31B:
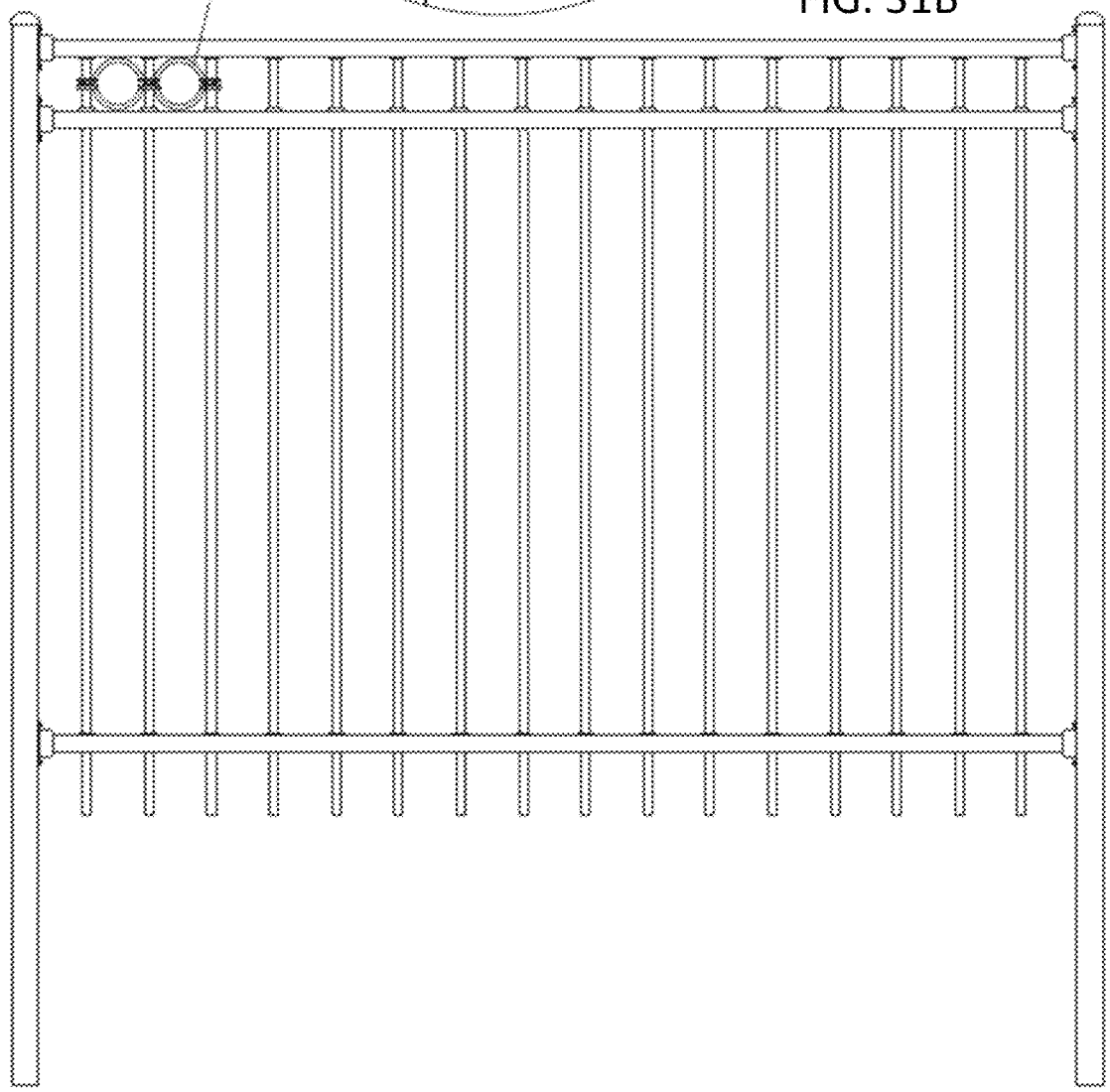
Figure 34:
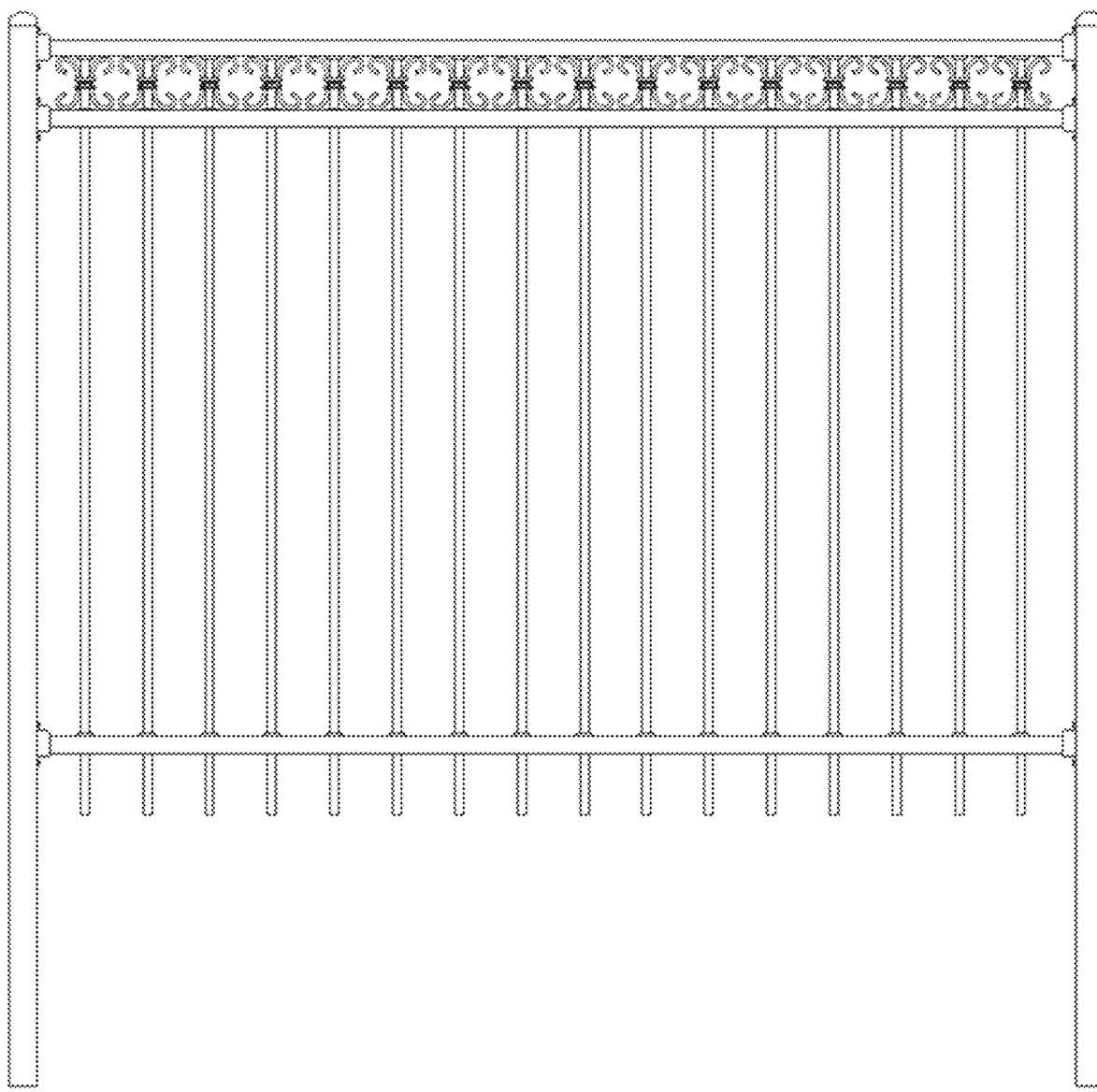
Figure 35:
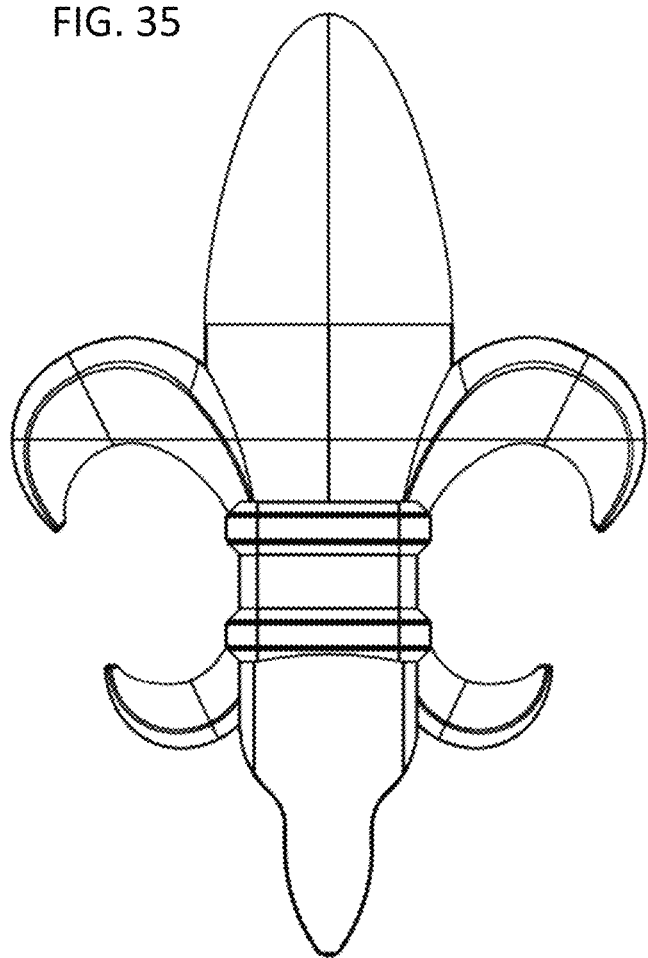
Figure 36:
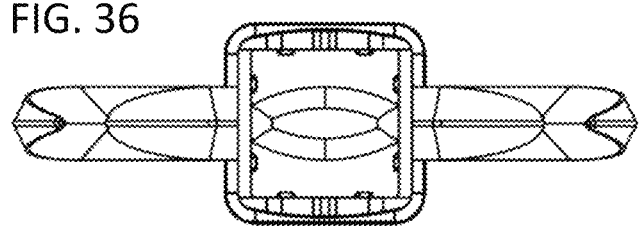
Figure 37:
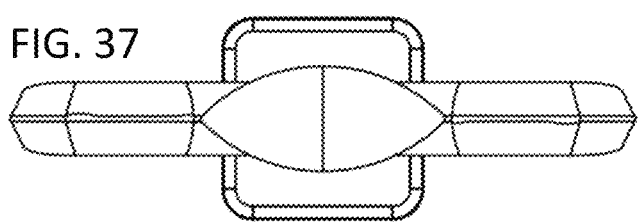

FIGS. 27 to 29 schematically illustrate a process of assembling a diamond shaped fence accessory. FIGS. 30-32 schematically illustrate a process of assembling a ring shaped fence accessory. FIGS. 33-34 schematically illustrate a process of assembling a butterfly shaped fence accessory.

By way of example, referring to FIGS. 33 and 34, an assembled fence includes a plurality of vertical fence bars, and an ornament body on each of (all or a set number of) the plurality of vertical fence bars. The ornament body includes a connecting part. The connecting part of the ornament body and a capping block are connected to the vertical fence bar and clamped together as one unit. This configuration is repeated on all or the set number of the vertical fence bars.

Referring again to FIGS. 33-34, according to an embodiment of the present disclosure, a method of assembling fence accessories on a fence includes attaching an ornament body 10 to a vertical fence bar 2, the ornament body 10 including a connecting part 11, and attaching a capping block 4 to the connecting part 11 such that the connecting part 11 of the ornament body 10 and the capping block lock with each other with the vertical fence bar 2 tightly fit inside a space formed in the middle of the locked connecting part 11 of the ornament body 10 and the capping block 4.

According to another embodiment of the present disclosure, a fence accessory may include an opening configured to lock with a fence bar. FIGS. 35-39 show various views of a fence accessory according to one embodiment of the present invention. As shown in FIGS. 35-39, the fence accessory may include an outer wall 38A and an inner wall 38B, and an opening 38C formed between the outer wall 38A and the inner wall 38B.

Figures 40A, 40B:
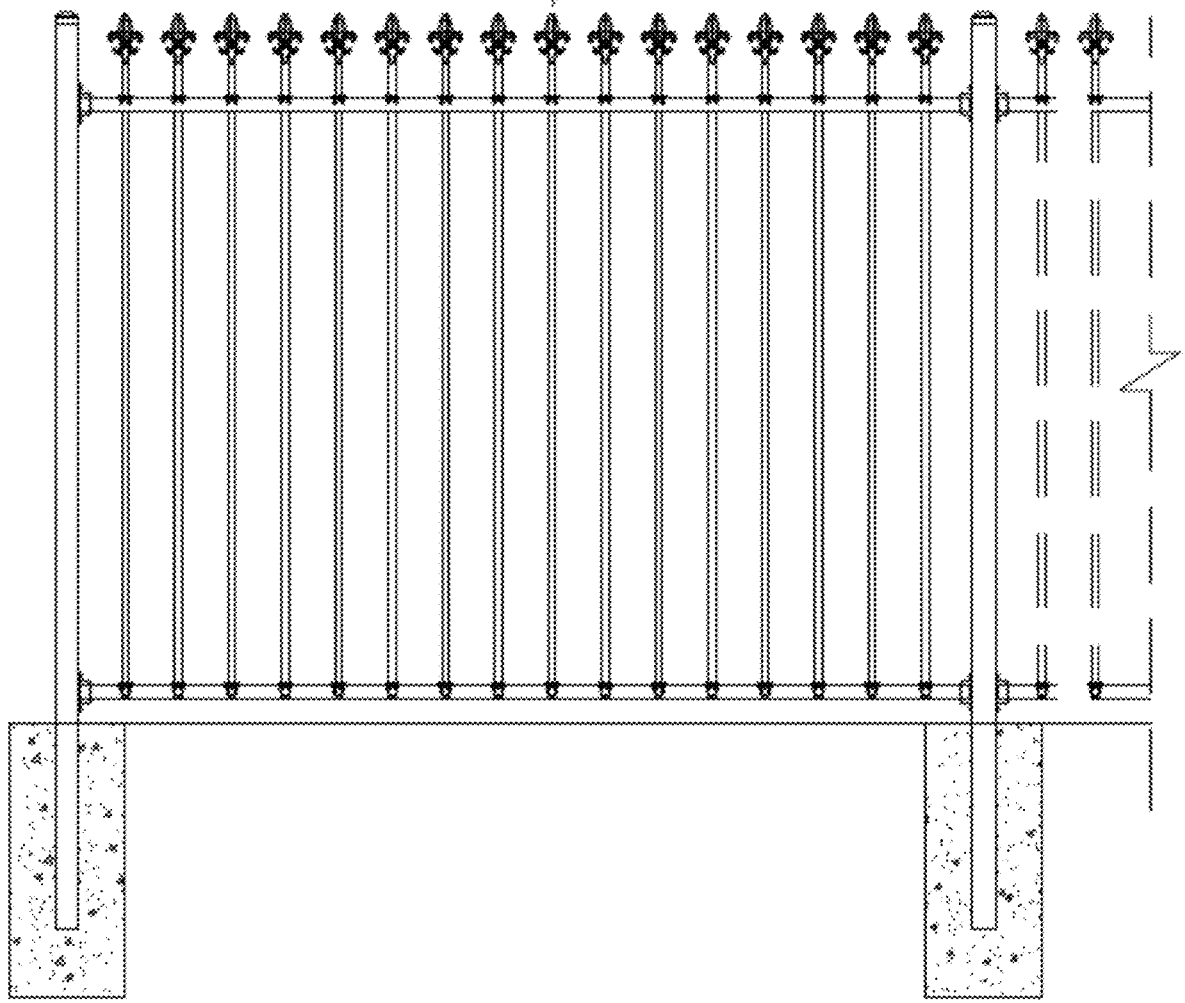
FIGS. 40A-40B are schematic illustrations of a fence assembly with the fence accessory of FIGS. 35-39.
Figure 41:
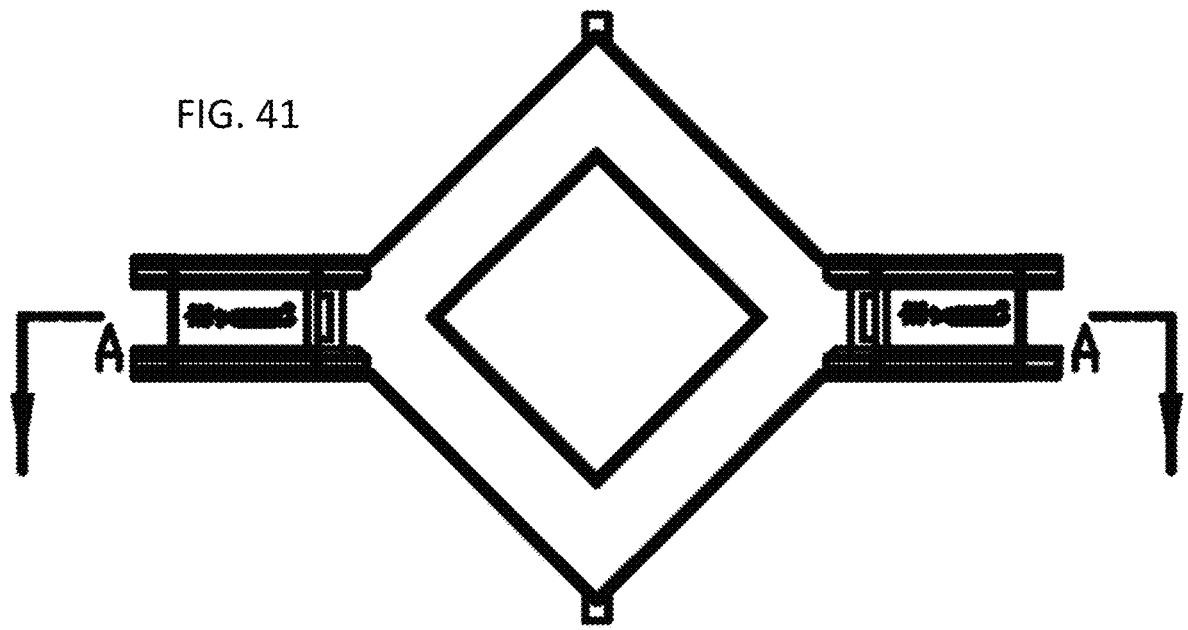
Figure 42:
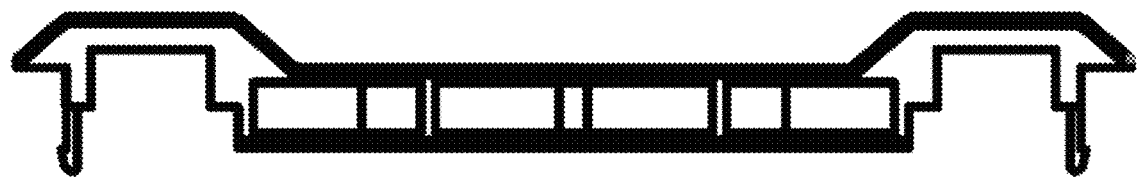
Figure 43:
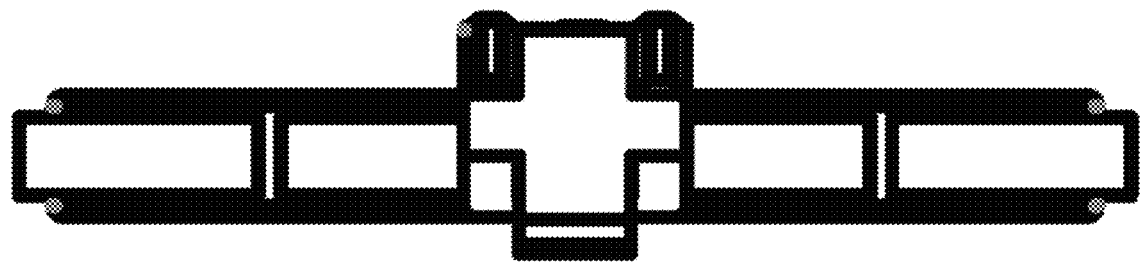
Figure 44:
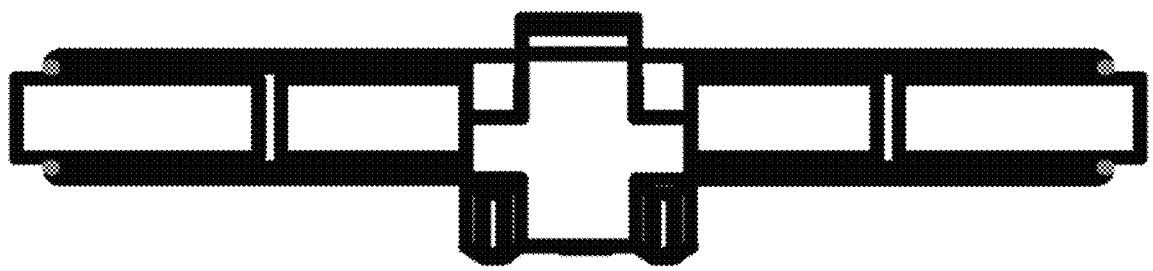
Figure 45:
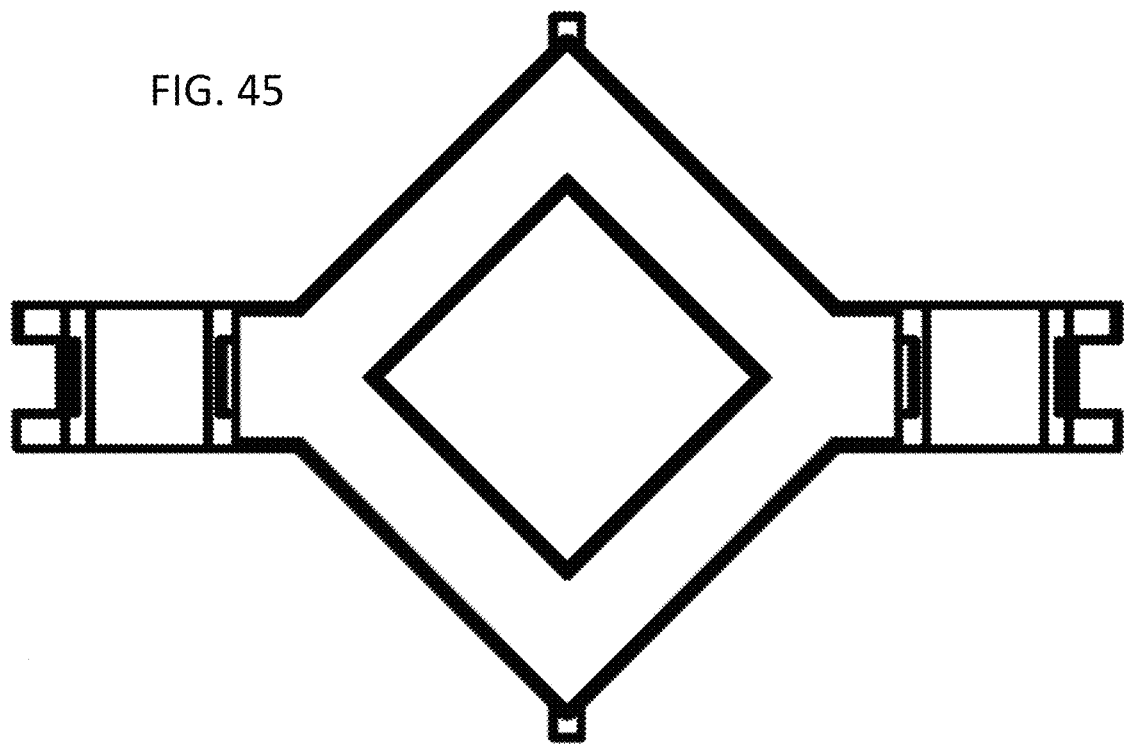
Figure 46:
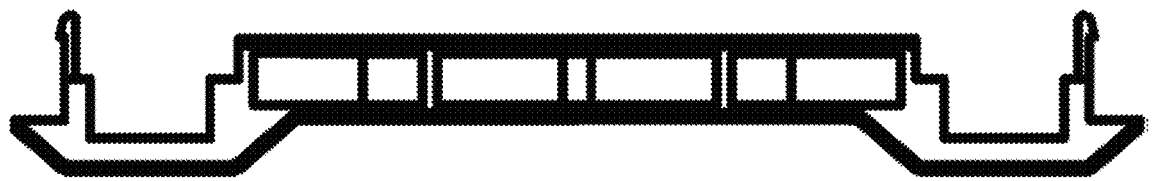
Figure 50:
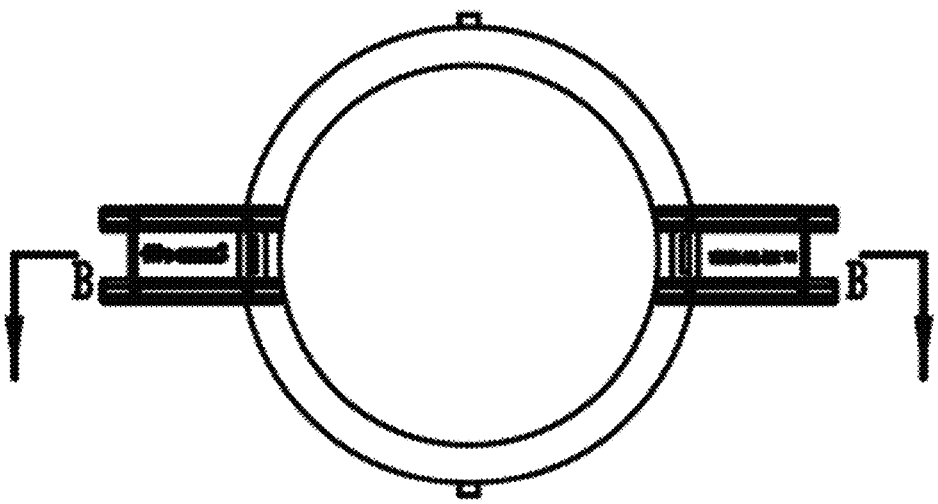
FIGS. 50-58 show various views of a ring shaped ornament body according to one embodiment of the present invention, where
Figure 51:
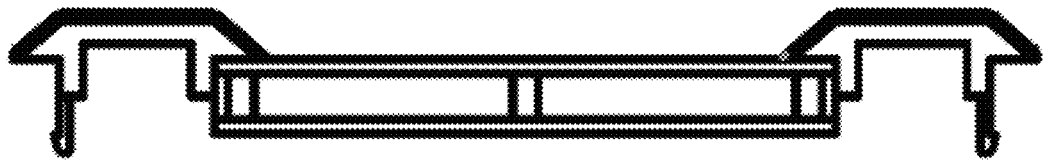
Figure 52:
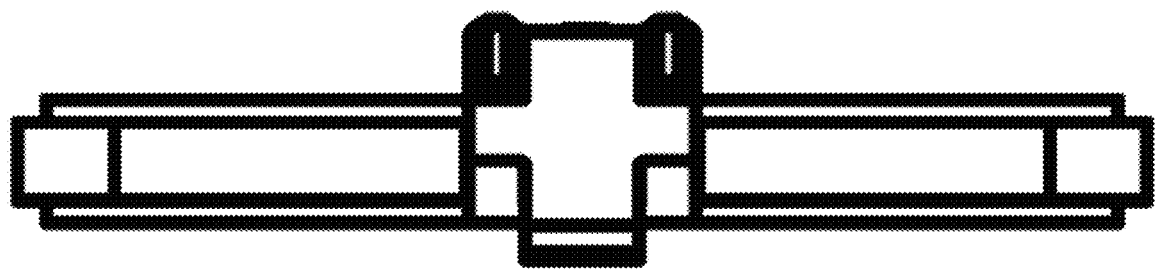
Figure 53:
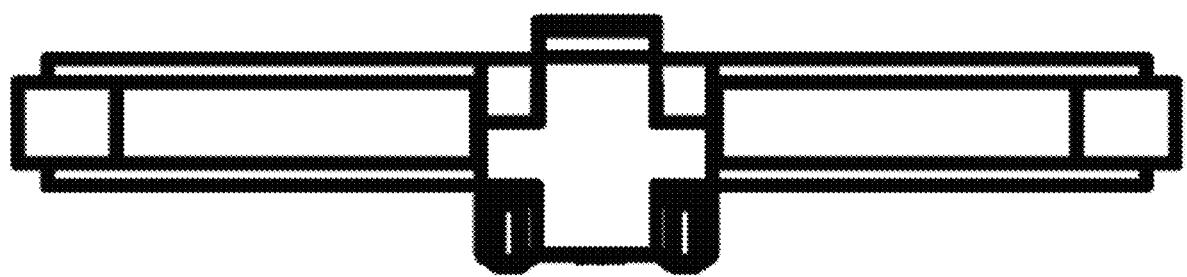
Figure 54:
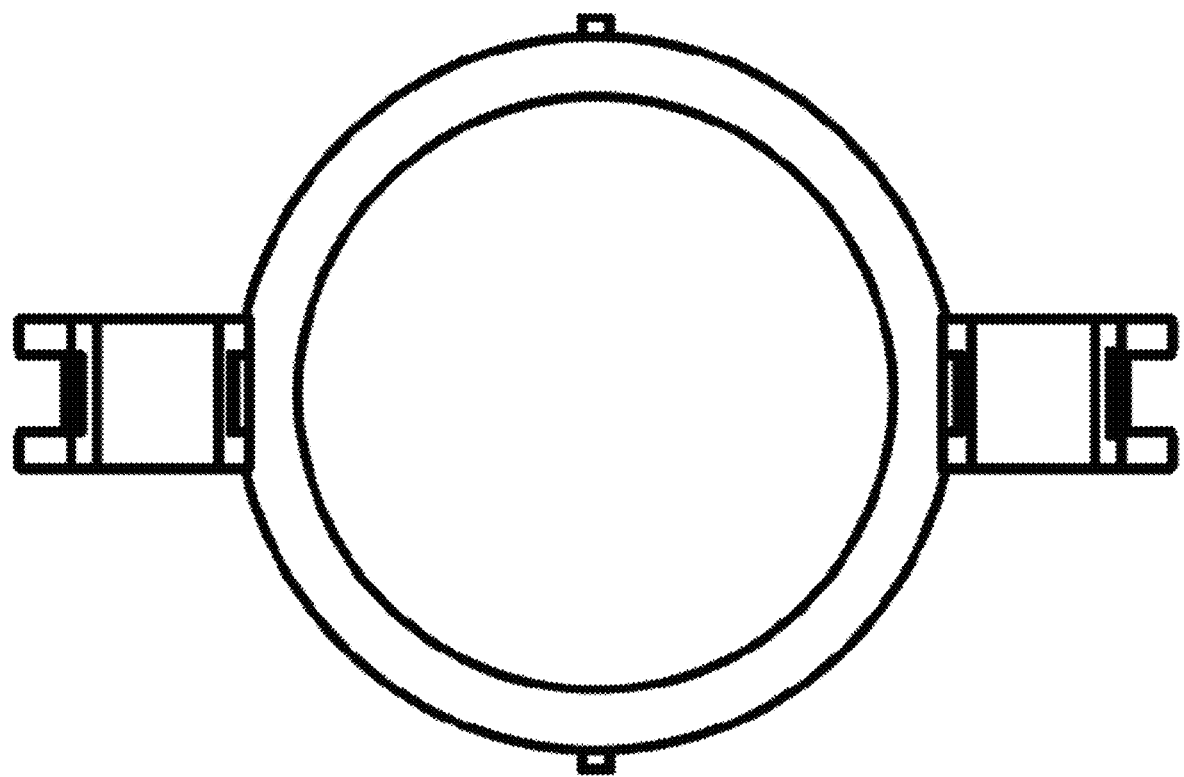
Figure 55:
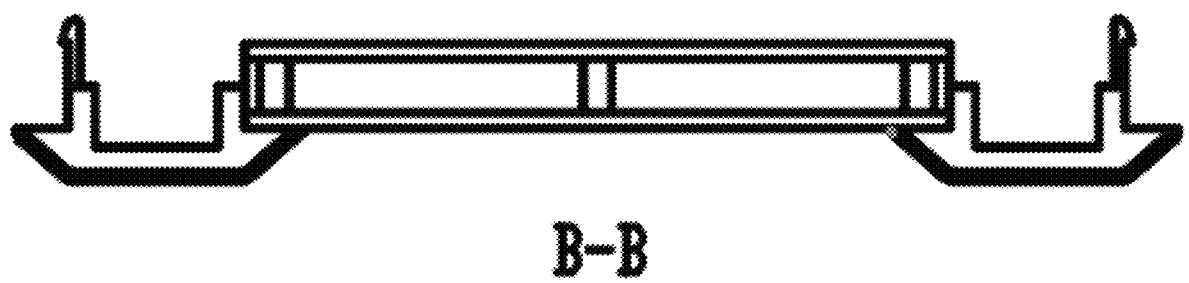
Figure 56:
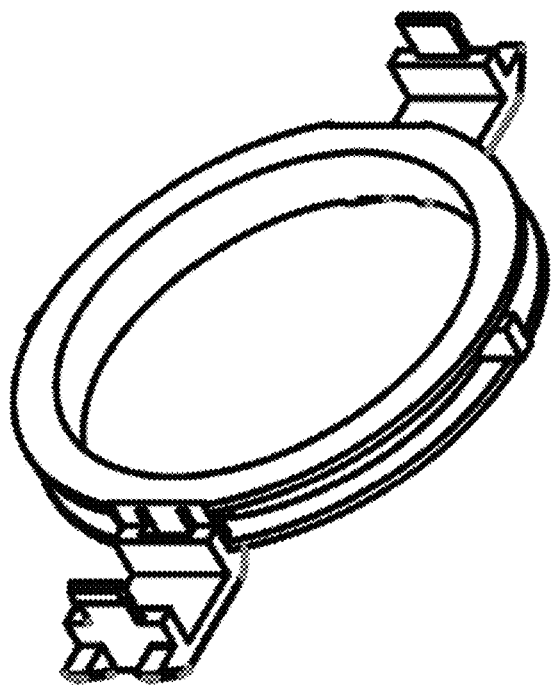
Figure 57:
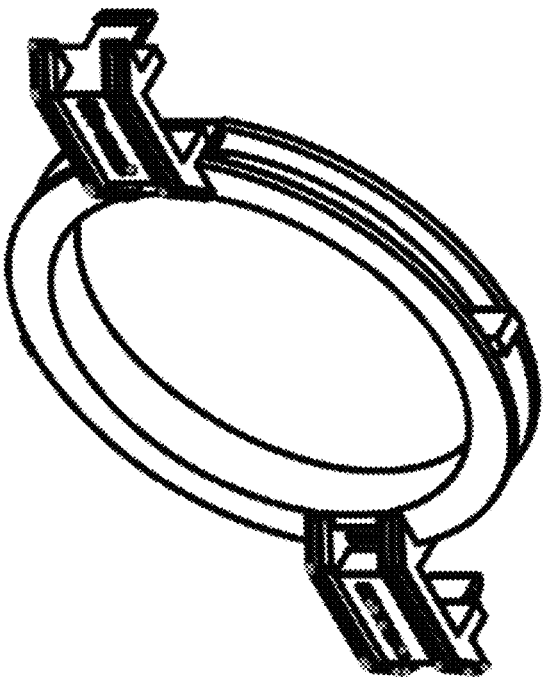
Figure 58:
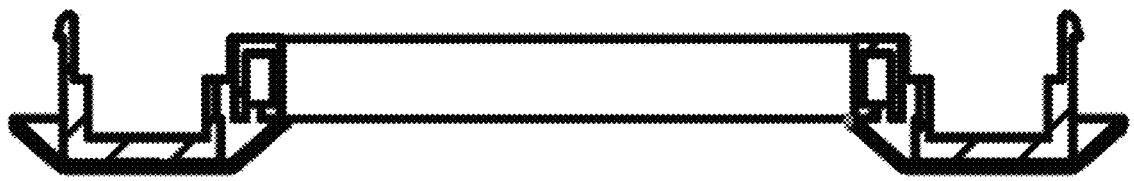

According to another embodiment of the present disclosure, a method of assembling a fence accessory includes attaching the fence accessory to a fence bar, wherein the fence accessory includes an opening configured to be locked with the fence bar. As shown in FIG. 40, during assembly, the opening 38C accommodates and fits the wall of a hollow fence bar to thereby attach the accessory with the fence bar.

It should be understood that the example embodiments described therein should be considered in a descriptive sense only and not for purposes of limitation. For example, while a vertical fence bar has been described in association with the fence accessories, the present invention is not limited thereto. In one embodiment, the accessories according to embodiments of the present disclosure are applied between a plurality of horizontal fence bars. Further, while certain design of the fence accessories have been illustrated in the drawings, the present invention is not limited thereto and various suitable designs may be utilized as the fence accessory. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. A fence accessory comprising:
at least two ornament bodies, each of the at least two ornament bodies comprising a first connecting part and a second connecting part at two opposing ends thereof,
wherein the first connecting part comprises a groove and a protrusion with a hook-shaped end at two opposing sides of the first connecting part, respectively,
wherein the second connecting part comprises a groove and a protrusion with a hook-shaped end at two opposing sides of the second connecting part, respectively,
wherein the groove of the first connection part and the groove of the second connection part each comprises two side walls facing each other, and a passage defined between the two side walls, and
wherein the first connecting part of one of the at least two ornament bodies and the second connecting part of another one of the at least two ornament bodies are configured to be directly locked into each other as one unit with a fence bar therebetween through locking one's protrusion with the hook-shaped end into another one's passage.

2. The fence accessory of claim 1, further comprising a capping block configured to lock with the first connecting part and/or the second connecting part of an ornament body of the at least two ornament bodies.

3. The fence accessory of claim 1, wherein the hook-shaped end of the first connecting part of one ornament body is configured to be locked inside the groove of the second connecting part of an adjacent ornament body.

4. A fence, comprising:
a plurality of fence bars; and
the fence accessory according to claim 1.

5. A method of assembling a fence accessory, the method comprising:
providing a plurality of fence bars and a plurality of ornament bodies, each of the plurality of ornament bodies comprising a first connecting part and a second connecting part at two opposing ends thereof,
wherein the first connecting part comprises a groove and a protrusion with a hook-shaped end at two opposing sides of the first connecting part, respectively,
wherein the second connecting part comprises a groove and a protrusion with a hook-shaped end at two opposing sides of the second connecting part, respectively, and
wherein the groove of the first connection part and the groove of the second connection part each comprises two side walls facing each other, and a passage defined between the two side walls;
attaching the first connecting part of a first ornament body of the plurality of ornament bodies to a first fence bar of the plurality of fence bars; and
attaching the second connecting part of a second ornament body of the plurality of ornament bodies to the first fence bar such that the first connecting part of the first ornament body and the second connecting part of the second ornament body directly lock into each other as one unit with the first fence bar therebetween through locking one's protrusion with the hook-shaped end into another one's passage.

6. The method of claim 5, further comprising:
attaching the first connecting part of the second ornament body to a second fence bar of the plurality of fence bars; and
attaching the second connecting part of a third ornament body of the plurality of ornament bodies to the second fence bar such that the first connecting part of the second ornament body and the second connecting part of the third ornament body lock with each other around the second fence bar.

7. The method of claim 5, further comprising:
attaching the second connecting part of a fourth ornament body of the plurality of ornament bodies to an outermost fence bar, and
attaching a capping block to the outermost fence bar such that the second connecting part of the fourth ornament body locks with the capping block around the outermost fence bar.

* * * * *